US008705102B2

(12) United States Patent
Tashiro

(10) Patent No.: US 8,705,102 B2
(45) Date of Patent: Apr. 22, 2014

(54) MULTI-FUNCTION MACHINE, CONTROL METHOD FOR THE SAME, AND PROGRAM FOR IMPLEMENTING THE METHOD

(75) Inventor: Hirohiko Tashiro, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/250,353

(22) Filed: Sep. 30, 2011

(65) Prior Publication Data

US 2012/0057205 A1  Mar. 8, 2012

Related U.S. Application Data

(63) Continuation of application No. 11/094,553, filed on Mar. 5, 2005, now Pat. No. 8,049,914.

(30) Foreign Application Priority Data

Mar. 31, 2004  (JP) ................................. 2004-105875

(51) Int. Cl.
*G06F 3/12* (2006.01)
*F16C 33/58* (2006.01)
*G06K 7/00* (2006.01)

(52) U.S. Cl.
USPC ......... 358/1.15; 358/1.13; 386/108; 384/569; 382/312

(58) Field of Classification Search
USPC .................. 358/1.15, 296; 707/500; 715/527; 704/217
See application file for complete search history.

(56) References Cited

U.S. PATENT DOCUMENTS

| 4,979,047 | A | * | 12/1990 | Wine | 386/205 |
|---|---|---|---|---|---|
| 5,699,494 | A | * | 12/1997 | Colbert et al. | 358/1.15 |
| 5,963,337 | A | * | 10/1999 | Inui et al. | 358/296 |
| 6,170,007 | B1 | * | 1/2001 | Venkatraman et al. | 709/218 |
| 6,298,172 | B1 | * | 10/2001 | Arney et al. | 382/293 |
| 6,646,755 | B1 | * | 11/2003 | Iwai et al. | 358/1.14 |
| 7,334,224 | B2 | * | 2/2008 | Haga et al. | 717/168 |
| 7,412,447 | B2 | * | 8/2008 | Hilbert et al. | 1/1 |
| 7,532,716 | B2 | * | 5/2009 | Otsuka | 379/352 |
| 7,551,787 | B2 | * | 6/2009 | Marks | 382/239 |
| 7,644,211 | B2 | * | 1/2010 | Toebes et al. | 710/106 |
| 7,664,825 | B2 | * | 2/2010 | Yeung et al. | 709/217 |

(Continued)

FOREIGN PATENT DOCUMENTS

| JP | 5-130311 A | 5/1993 |
|---|---|---|
| JP | 2002-297325 A | 10/2002 |
| JP | 2002-305616 A | 10/2002 |
| JP | 2004-054267 A | 2/2004 |

*Primary Examiner* — Akwasi M Sarpong
(74) *Attorney, Agent, or Firm* — Rossi, Kimms & McDowell LLP

(57) ABSTRACT

A multi-function apparatus capable of properly coping with cases where an auto-clear function is activated is provided. An operating section of a copying machine displays an operating screen associated with each function and receives inputs via the operating screen. According to the auto-clear function, set values associated with predetermined functions are reset to initial values when no input operation has been performed via the operating section over a predetermined time period, and the operating section is caused to display an operating screen associated with a predetermined function. A controller unit of the machine determines whether the copying machine should be operated in a first mode in which disconnection from the network is carried out or in a second mode in which connection to the network is maintained. The controller unit selects one of the first mode and the second mode based on a result of the determination.

8 Claims, 18 Drawing Sheets

(56) References Cited

U.S. PATENT DOCUMENTS

| | | | |
|---|---|---|---|
| 2002/0046217 A1* | 4/2002 | Kanazawa | 707/500 |
| 2004/0027602 A1* | 2/2004 | Kuboki | 358/1.13 |
| 2005/0114766 A1* | 5/2005 | Yamamoto | 715/527 |
| 2005/0162688 A1* | 7/2005 | Nakaoka et al. | 358/1.15 |
| 2006/0077428 A1* | 4/2006 | Lovat et al. | 358/1.15 |
| 2006/0123166 A1* | 6/2006 | Toebes et al. | 710/106 |

* cited by examiner

MULTI-FUNCTION MACHINE, CONTROL METHOD FOR THE SAME, AND PROGRAM FOR IMPLEMENTING THE METHOD

This is a continuation of and claims priority from U.S. patent application Ser. No. 11/094,553 filed Mar. 30, 2005, the content of which is incorporated herein by reference.

BACKGROUND OF THE INVENTION

1. Field of the Invention

The present invention relates to a multi-function machine, a control method for the same, and a program for implementing the method, and more particularly to a multi-function machine connectable to a network and having a plurality of functions including a network display function of receiving predetermined information from an apparatus or device on the network and displaying the information and displaying information based on the received information, a control method for the same, and a program for implementing the method.

2. Description of the Related Art

In recent years, multi-function machines which are comprised of a digital copying machine as a basic component, a scanner, and a printer and are equipped with a number of additional functions have been actually used. The multi-function machines are equipped with functions for performing facsimile transmission using a scanner or a printer, expanding code data sent from a computer into bitmap data and printing out the same using the printer, transmitting images read using the scanner onto a network, and printing images distributed via the network, using the printer.

There have been proposed a type of multi-function machines constructed by combining a copying machine having a copying function and a facsimile function, and a unit connected to the copying machine and having a plurality of functions, such as a printer/formatter function, an image electronic file function, and an image memory function (see e.g. Japanese Laid-Open Patent Publication (Kokai) No. H05-130311). Some of the multi-function machines of the above-mentioned types are configured to display icons corresponding to the respective functions on an operating section thereof, thereby enabling configuration of the settings of the functions upon pressing the respective corresponding icons. For example, there is a multi-function machine configured such that in a copy mode in which settings of the copying function can be configured, if none of the keys of the operating section have been operated over a predetermined time period, an auto-clear function (automatic clearing function) is activated to automatically reset the settings of the copying function.

In such a multi-function machine, as disclosed in Japanese Laid-Open Patent Publication (Kokai) No. 2002-305616, the user is allowed to select from the above-mentioned functions a function whose settings are to be reset by the activated auto-clear function, or to specify whether the currently used function (mode) should be maintained, i.e. continued to be used after execution of the auto-clear function or a predetermined function (mode) should be started after execution of the auto-clear function. Further, the user is also allowed to specify whether the auto-clear function, when activated, should clear the settings of all the functions, or clear set values for functions which are not currently displayed while the set values for the currently displayed function or functions are not cleared, or alternatively, whether only set values for one or more predetermined functions should be cleared regardless of whether or not the predetermined function or functions are currently displayed.

The operating panels of such multi-function machines have been increased in size, so that the operating screen is large enough to present displays for monitoring the operation and status of a remote machine or apparatus on a network as well as to display HTML contents via a browser, as well as displays for setting operations of functions using a scanner and a printer. Further, there have been realized even cellular phones and facsimile machines which have a browser screen incorporated therein, and hence it is expected that the operating sections of multi-function machines, such as those based on a copying machine, will be more and more widely used for displaying HTML contents via a browser or monitoring the operation and status of a remote machine on a network.

However, none of the above described conventional multi-function machines are configured to cope with cases where the auto-clear function is activated during display of the status of a remote machine on a network or during display of contents on the network.

Further, none of the above described conventional multi-function machines are configured to properly cope with cases where a screen displaying contents received from a terminal on the network is switched to another screen for another function of the machine, and then switched again to return to the screen for displaying the contents.

SUMMARY OF THE INVENTION

It is a first object of the present invention to provide a multi-function machine and a control method for the same, which are capable of properly coping with cases where an auto-clear function (automatic clearing function) is activated e.g. after execution of display of a network display function for displaying the status of a remote machine on a network or displaying contents on the network, to thereby improve operability after execution of the auto-clear function, and a program for implementing the method.

It is a second object of the present invention to provide a multi-function machine and a control method for the same, which are capable of properly coping with cases where a display screen displaying a network display function for displaying the status of a remote machine on a network or displaying contents on the network is switched to display for another function and then switched to the display of the network display function, to thereby improve operability upon switching of the display screen, and a program for implementing the method.

To attain the first object, in a first aspect of the present invention, there is provided a multi-function apparatus connectible to a network and having a plurality of functions including a network-display function for receiving predetermined information from an apparatus or device on the network and displaying information based on the received information, comprising an operating unit that displays a predetermined display screen and receives an instruction based on the display screen, an auto-clear unit that resets the display screen displayed by the operating unit when the operating unit has not been operated over a predetermined time period, a determination unit operable when the auto-clear unit is to be activated after activation of the network-display function, to determine whether the multi-function apparatus is to be operated in a first operation mode in which the display screen displayed according to the network-display function is changed to a default screen or is to be operated in a second operation mode in which the display screen displayed according to the network-display function is maintained, and a control unit that selects one of the first operation mode and the second operation mode based on a result of the determination by the determination unit.

With the configuration of the first aspect of the present invention, in the multi-function apparatus connectible to a network and having a plurality of functions including a network-display function for receiving predetermined information from an apparatus or device on the network and displaying information based on the received information, the operating unit displays a predetermined display screen and receives an instruction based on the display screen, and the auto-clear unit resets the display screen displayed by the operating unit when the operating unit has not been operated over a predetermined time period. On the other hand, when the auto-clear unit is to be activated after activation of the network-display function, the determination unit determines whether the multi-function apparatus is to be operated in a first operation mode in which the display screen displayed according to the network-display function is changed to a default screen or is to be operated in a second operation mode in which the display screen displayed according to the network-display function is maintained, and the control unit selects one of the first operation mode and the second operation mode based on a result of the determination by the determination unit.

As a result, it is possible to properly cope with cases where the auto-clear function (automatic clearing function) is activated e.g. after execution of display of the network display function for displaying the status of a remote machine on a network or displaying contents on the network, to thereby improve operability after execution of the auto-clear function.

Preferably, the multi-function apparatus further comprises a receiving unit that receives in advance an instruction as to which of the first mode and the second mode the multi-function apparatus should be operated in, and the determination unit performs the determination with reference to the instruction received by the receiving unit.

Preferably, the multi-function apparatus further comprises a connection destination registration unit that registers in advance at least one apparatus or device as a connection destination on the network, and the determination unit determines that the multi-function apparatus should be operated in the second mode, when the predetermined information from an apparatus or device registered in advance in the connection destination registration unit is currently displayed by the operating unit according to the network display function, and determines that the multi-function apparatus should be operated in the first mode, when the predetermined information from an apparatus or device different from the apparatus or device registered in advance in the connection destination registration unit is currently displayed by the operating unit according to the network display function.

Preferably, the predetermined information is at least one of information indicative of a status of the apparatus or device on the network and display information displayed by the apparatus or device.

To attain the first object, in a second aspect of the present invention, there is provided a control method for a multi-function apparatus connectible to a network and having a plurality of functions including a network-display function for receiving predetermined information from an apparatus or device on the network and displaying information based on the received information, and an operating unit that displays a predetermined display screen and receives an instruction based on the display screen, comprising an auto-clear step of resetting the display screen displayed by the operating unit when the operating unit has not been operated over a predetermined time period, a determination step of determining whether the multi-function apparatus is to be operated in a first operation mode in which the display screen displayed according to the network-display function is changed to a default screen or is to be operated in a second operation mode in which the display screen displayed according to the network-display function is maintained, when said auto-clear step is to be executed after activation of the network-display function, and a control step of selecting one of the first operation mode and the second operation mode based on a result of the determination in the determination step.

Preferably, the control method further comprises a receiving step of receiving in advance an instruction as to which of the first mode and the second mode the multi-function apparatus should be operated in, and the determination step comprises performing the determination with reference to the instruction received in the receiving step.

Preferably, the control method further comprises a connection destination registration step of registering in advance at least one apparatus or device as a connection destination on the network, and the determination step comprises determining that the multi-function apparatus should be operated in the second mode, when the predetermined information from an apparatus or device registered in advance in the connection destination registration step is currently displayed by the operating unit according to the network display function, and determining that the multi-function apparatus should be operated in the first mode, when the predetermined information from an apparatus or device different from the apparatus or device registered in advance in the connection destination registration step is currently displayed by the operating unit according to the network display function.

To attain the first object, in a third aspect of the present invention, there is provided a program for causing a computer to execute a control method for a multi-function apparatus connectible to a network and having a plurality of functions including a network-display function for receiving predetermined information from an apparatus or device on the network and displaying information based on the received information, and an operating unit that displays a predetermined display screen and receives an instruction based on the display screen, comprising an auto-clear module for resetting the display screen displayed by the operating unit when the operating unit has not been operated over a predetermined time period, a determination module for determining whether the multi-function apparatus is to be operated in a first operation mode in which the display screen displayed according to the network-display function is changed to a default screen or is to be operated in a second operation mode in which the display screen displayed according to the network-display function is maintained, when the auto-clear module is to be activated after activation of the network-display function, and a control module for selecting one of the first operation mode and the second operation mode based on a result of the determination by the determination module.

Preferably, the program further comprises a receiving module for receiving in advance an instruction as to which of the first mode and the second mode the multi-function apparatus should be operated in, and the determination module performs the determination with reference to the instruction received by the receiving module.

Preferably, the program further comprises a connection destination registration module for registering in advance at least one apparatus or device as a connection destination on the network, and the determination module determines that the multi-function apparatus should be operated in the second mode, when the predetermined information from an apparatus or device registered in advance by the connection destination registration module is currently displayed by the operating unit according to the network display function, and determines that the multi-function apparatus should be operated in the first mode, when the predetermined information from an apparatus or device different from the apparatus or device registered in advance by the connection destination registration module is currently displayed by the operating unit according to the network display function.

To attain the second object, in a fourth aspect of the present invention, there is provided a multi-function apparatus connectible to a network and having a plurality of functions including a network-display function for receiving predetermined information from an apparatus or device on the network and displaying information based on the received information, comprising an operating unit that displays a predetermined display screen and receives an instruction based on the display screen, a switching unit that switches a display screen displayed according to the network-display function to a display screen displayed according to another function, a determination unit operable when the switching unit switches the display screen displayed according to the network-display function to the display screen displayed according to the other function, to determine whether the multi-function apparatus is to be operated in a first operation mode in which the display screen displayed according to the network-display function is changed to a default screen or is to be operated in a second operation mode in which the display screen displayed according to the network-display function is maintained, and a control unit that selects one of the first operation mode and the second operation mode based on a result of the determination by the determination unit.

With the configuration of the fourth aspect of the present invention, it is possible to properly cope with cases where a display screen displaying a network display function for displaying the status of a remote machine on a network or displaying contents on the network is switched to display for another function and then switched to the display of the network display function, to thereby improve operability upon switching of the display screen.

Preferably, the multi-function apparatus further comprises a setup unit that makes a setting as to which of the first mode and the second mode the multi-function apparatus should be operated in, when the switching unit switches the display screen displayed according to the network-display function to the display screen displayed according to the other function, and the determination unit performs the determination with reference to the setting set by the setup unit.

Preferably, the multi-function apparatus further comprises a connection destination registration unit that registers in advance at least one apparatus or device as a connection destination on the network, and the determination unit determines that the multi-function apparatus should be operated in the second mode, when the predetermined information from an apparatus or device registered in advance in the connection destination registration unit is currently displayed by the operating unit according to the network display function, and determines that the multi-function apparatus should be operated in the first mode, when the predetermined information from an apparatus or device different from the apparatus or device registered in advance in the connection destination registration unit is currently displayed by the operating unit according to the network display function.

Preferably, the predetermined information is at least one of information indicative of a status of the apparatus or device on the network and display information displayed by the apparatus or device.

To attain the second object, in a fifth aspect of the present invention, there is provided a control method for a multi-function apparatus connectible to a network and having a plurality of functions including a network-display function for receiving predetermined information from an apparatus or device on the network and displaying information based on the received information, and an operating unit that displays a predetermined display screen and receives an instruction based on the display screen, comprising a switching step of switching a display screen displayed according to the network-display function to a display screen displayed according to another function, and a determination step of determining whether the multi-function apparatus is to be operated in a first operation mode in which the display screen displayed according to the network-display function is changed to a default screen or is to be operated in a second operation mode in which the display screen displayed according to the network-display function is maintained, when the display screen displayed according to the network-display function is switched to the display screen displayed according to the other function, in the switching step, and a control step of selecting one of the first operation mode and the second operation mode based on a result of the determination in the determination step.

To attain the second object, in a sixth aspect of the present invention, there is provided a program for causing a computer to execute a control method for a multi-function apparatus connectible to a network and having a plurality of functions including a network-display function for receiving predetermined information from an apparatus or device on the network and displaying information based on the received information, and an operating unit that displays a predetermined display screen and receives an instruction based on the display screen, comprising a switching module for switching a display screen displayed according to the network-display function to a display screen displayed according to another function, and a determination module for determining whether the multi-function apparatus is to be operated in a first operation mode in which the display screen displayed according to the network-display function is changed to a default screen or is to be operated in a second operation mode in which the display screen displayed according to the network-display function is maintained, when the switching module switches the display screen displayed according to the network-display function to the display screen displayed according to the other function, and a control module for selecting one of the first operation mode and the second operation mode based on a result of the determination module.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
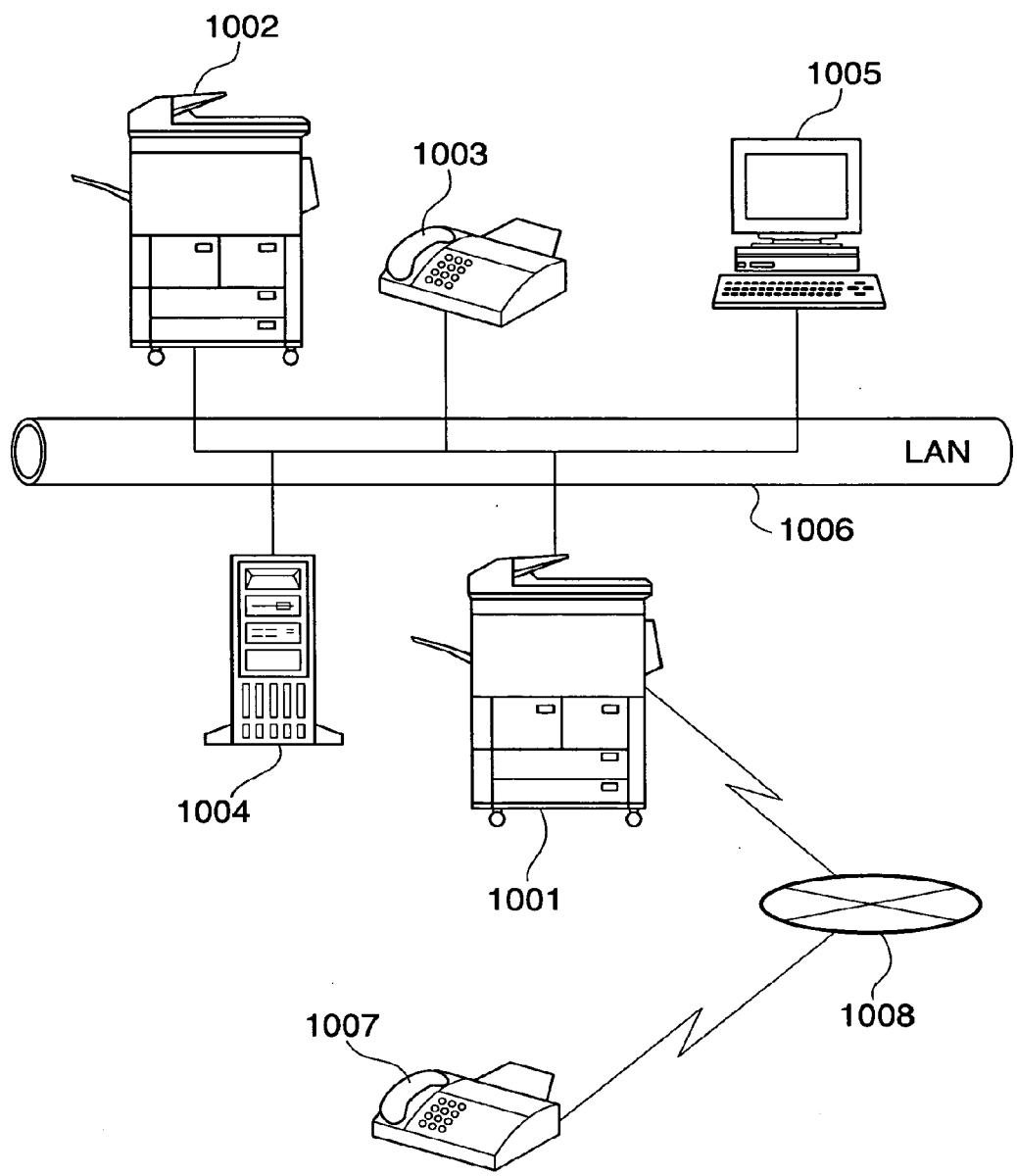
FIG. 1 is a diagram showing the network configuration of a system including a multi-function machine according to a first embodiment of the present invention.

FIG. 1 is a diagram showing the network configuration of a system including a multi-function machine according to a first embodiment of the present invention. The multi-function machine of the present embodiment is implemented by a copying machine provided with a data transmission/reception function.

In the system shown in FIG. 1, the copying machine 1001 is connected to a LAN 1006 implemented e.g. by an Ethernet (registered trademark), together with a copying machine 1002 having functions equivalent to those of the copying machine 1001, a facsimile machine 1003, a database/mail server 1004, and a client computer 1005. Further, the copying machine 1001 is connected to a public communication line 1008 together with a facsimile machine 1007. The copying machine 1001 is provided with a copying function and a facsimile transmission function, as well as a scanning function of reading original images and a data transmission function of sending image data obtained by the scanning function to the apparatuses on the LAN 1006. Further, the copying machine 1001 conforms to the PDL (Page Description Language), so that it can receive a PDL image from a computer connected to the LAN 1006 and print the same. The copying machine 1001 is capable of storing images read by the copying machine 1001 itself and PDL images sent from computers connected to the LAN 1006 in a designated box area in a hard disk drive (HDD) 2004 (FIG. 2) of the copying machine 1001, as well as capable of printing the images stored in the box area.

The copying machine 1001 is also capable of receiving image data read by the copying machine 1002, via the LAN 1006 and storing the received data in the HDD 2004 of the copying machine 1001 and/or printing out the same. Further, the copying machine 1001 is capable of receiving image data from the database/mail server 1004 via the client computer 1005 and the LAN 1006, and storing the image data in the copying machine 1001 or printing out the same. The facsimile machine 1003 is capable of receiving image data read by the copying machine 1001 via the LAN 1006 and sending the received image data by facsimile transmission.

The database/mail server 1004 is a server apparatus provided with a function of receiving image data read by the copying machine 1001, via the LAN 1006, and storing the received image data as a database, and a function of transmitting the received image data as an electronic mail.

The client computer 1005 is capable of accessing the database/mail server 1004 to acquire desired data from the database/mail server 1004, and displaying the data, as well as capable of receiving image data read by the copying machine 1001, via the LAN 1006, and processing/editing the received image data.

The facsimile machine 1007 is capable of receiving image data read by the copying machine 1001 via the public communication line 1008 and printing out the received image data.

Figure 2:
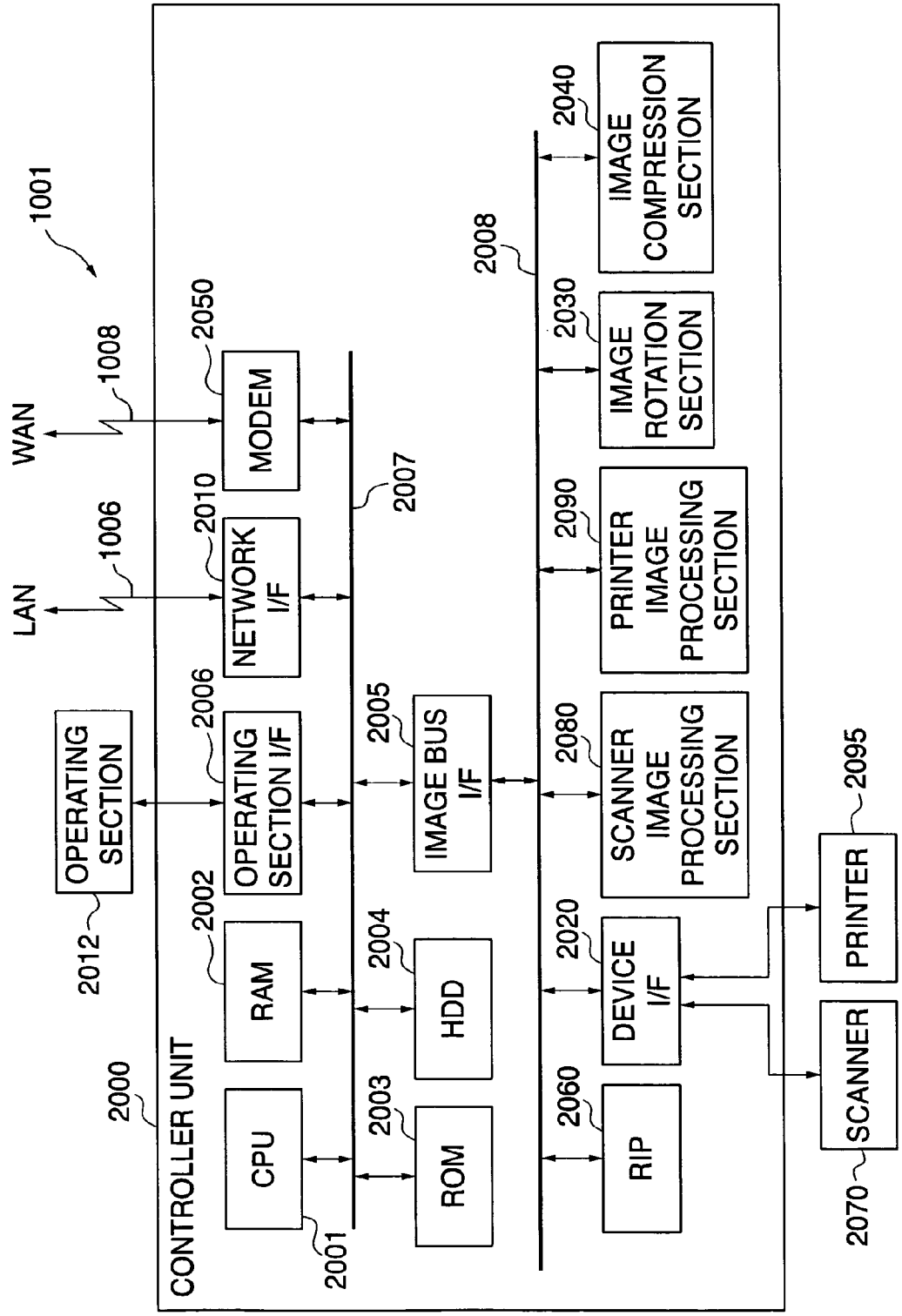
FIG. 2 is a block diagram showing the configuration of essential parts of the multi-function machine in FIG. 1.

FIG. 2 is a block diagram showing the configuration of essential parts of the copying machine 1001 in FIG. 1.

The copying machine 1001 includes a controller unit 2000. Connected to the controller unit 2000 are a scanner 2070 as an image input device and a printer 2095 as an image output device, as well as an operating section 2012 provided with a touch panel. The controller unit 2000 provides control for realizing the copying function of printing out image data read by the scanner 2070, using the printer 2095, as well as for connecting the copying machine 1001 to the LAN 1006 or the public communication line 1008 formed e.g. by a WAN (Wide Area Network) to thereby input and output image information and device information.

More specifically, the controller unit 2000 includes a CPU 2001, which starts up an operating system (OS) by a boot program stored in a ROM 2003, and executes application programs stored in the HDD 2004 on the OS to thereby carry out various processes. A RAM 2002 is used as a work area for the CPU 2001. The RAM 2002 is used by the CPU 2001 not only as the work area, but also as an image memory area for temporarily storing image data. The HDD 2004 stores the above-mentioned application programs and image data.

Connected to the CPU 2001 via a system bus 2007 are not only the ROM 2003 and the RAM 2002 but also an operating section I/F (operating section interface) 2006, a network I/F (network interface) 2010, a modem 2050, and an image bus I/F (image bus interface) 2005.

The operating section I/F 2006 provides interface for communication with the operating section 2012, and image data to be displayed on the operating section 2012 is output to the operating section 2012 via the operating section I/F 2006. Further, the operating section I/F 2006 transfers data input by a user via the operating section 2012 to the CPU 2001.

The network I/F 2010 is connected to the LAN 1006 to send and receive information with to and from each of the apparatuses on the LAN 1006 via the LAN 1006. The modem 2050 is connected to the public communication line 1008 to send and receive information via the public communication line 1008.

The image bus I/F 2005 is a bus bridge that connects between the system bus 2007 and an image bus 2008 for use in high-speed transfer of image data, and performs conversion of data formats. The image bus 2008 is implemented by a PCI bus or an IEEE 1394. On the image bus 2008, there are provided a raster image processor (hereinafter referred to as "the RIP") 2060, a device I/F 2020, a scanner image processing section 2080, a printer image processing section 2090, an image rotation section 2030, and an image compression section 2040.

The RIP 2060 is a processor that expands a PDL image into a bitmap image. The device I/F 2020 is connected to the scanner 2070 and the printer 2095, and performs synchronous-to-asynchronous conversion of image data. The scanner image processing section 2080 corrects, manipulates, and edits input image data. The printer image processing section 2090 performs correction, resolution conversion, etc. of image data to be printed out, so as for the image data to conform to the printer 2095. The image rotation section 2030 rotates image data. The image compression section 2040 compresses multi-valued image data into JPEG data, and binary image data into JBIG, MMR or MH data, as well as performs expansion of the compressed data.

Next, a description will be given of the hardware configuration of the scanner 2070 and the printer 2095 with reference to FIG. 3.

Figure 3:
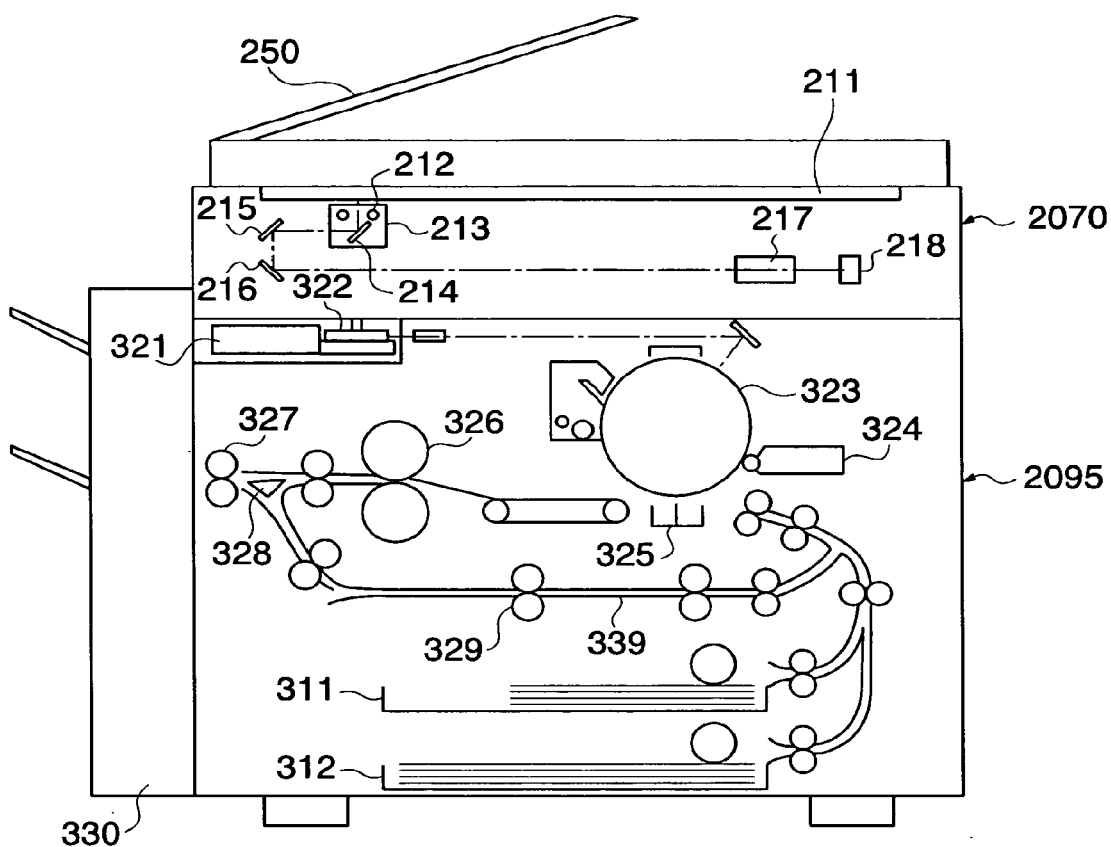
FIG. 3 is a side cross-sectional view showing the hardware configuration of a scanner and a printer appearing in FIG. 2.

FIG. 3 is a side cross-sectional view showing the hardware configuration of the scanner 2070 and the printer 2095 in FIG. 2.

The scanner 2070 and the printer 2095 are integrally configured as shown in FIG. 3. The scanner 2070 has an original sheet feeding unit 250 provided thereon. In the original sheet feeding unit 250, originals are sequentially fed one by one from the leading page onto a platen glass 211, and whenever an operation of reading an original is completed, the original is discharged from the platen glass 211 onto a discharge tray, not shown. When the original is fed onto the platen glass 211, the scanner 2070 turns on a lamp 212 and starts moving a moving unit 213. By the motion of the moving unit 213, scanning is performed to read the original on the platen glass 211. During this scanning, reflected light from the original is guided through mirrors 214, 215, and 216, and a lens 217 to a CCD 218 as an image sensor, and the image on the original is formed on the image pick-up surface of the CCD 218. The CCD 218 converts the image formed on the image pick-up surface into an electric signal. The electric signal is subjected to predetermined processing, followed by being input to a control device, not shown.

The printer 2095 is provided with a laser driver 321. The laser driver 321 drives a laser emission section 322 based on the image data input from the control device. The laser emission section 322 generates and emits a laser beam according to the image data, which is irradiated onto a photosensitive drum 323 to scan the same. On the photosensitive drum 323, an electrostatic latent image is formed according to the irradiated laser beam, and this electrostatic latent image is visualized as a toner image by toner supplied from a developing device 324. In timing synchronous with the irradiation of the laser beam, a recording sheet is fed from one of a cassette 311 and a cassette 312 into a space between the photosensitive drum 323 and a transfer section 325, and the toner image on the photosensitive drum 323 is transferred onto the recording sheet fed by the transfer section 325.

The recording sheet having the toner image transferred thereon is conveyed by a conveyor belt to a fixing roller pair 326 formed by a heating roller and a pressing roller. The fixing roller pair 326 fixes the toner image on the recording sheet by heating the recording sheet under pressure. After having passed through the fixing roller pair 326, the recording sheet is discharged into a discharge unit 330 by a discharge roller pair 327. The discharge unit 330 is implemented by a sheet processing apparatus capable of performing post-processing, such as sorting and stapling.

When the copying machine 1001 is set to a double-sided printing mode, the recording sheet is conveyed to the discharge roller pair 327, and then the direction of rotation of the discharge roller pair 327 is reversed such that the recording sheet is guided to a re-feeding conveying passage 339 by a flapper 328. The recording sheet guided to the re-feeding conveying passage 339 is re-fed to the space between the photosensitive drum 323 and the transfer section 325 in the same timing as described above, whereby a toner image is transferred onto the back side of the recording sheet.

Figure 4:
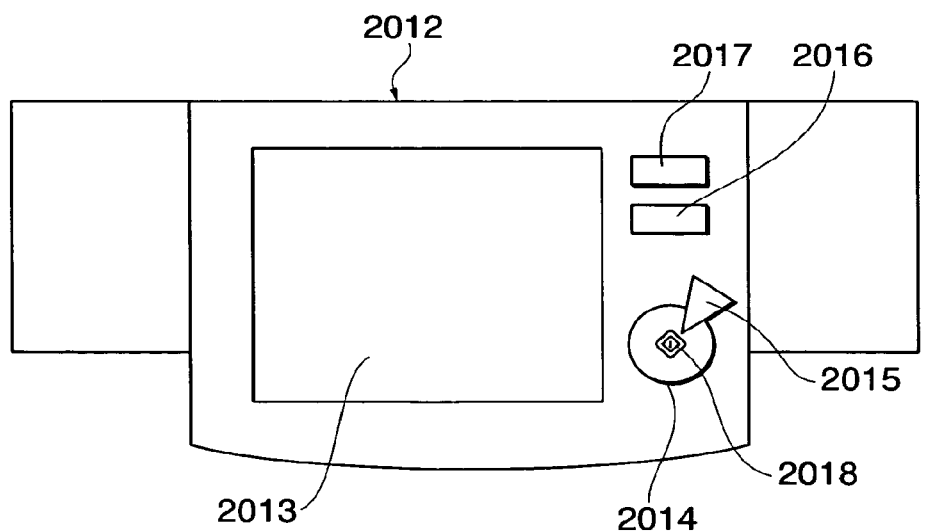
FIG. 4 is a plan view showing the arrangement of an operating section appearing in FIG. 2.

FIG. 4 is a plan view showing the arrangement of the operating section 2012.

A LCD display section 2013 appearing in FIG. 4 is comprised of a LCD and a touch panel sheet attached thereto. The LCD display section 2013 displays an operating screen for the copying machine 1001, and when a touch key displayed on the screen is pressed, the LCD display section 2013 sends position information of the touch key to the CPU 2001 of the controller unit 2000. A start key 2014 is used e.g. for starting an operation of reading an original image. In the center of the start key 2014, there is provided a two-color LED 2018 which emits a green light or a red light to indicate whether or not a function set by pressing the start key 2014 is available. A stop key 2015 is operated to stop a current operation. An ID key 2016 is used to enter the user ID of a user. A reset key 2017 is used to initialize settings configured by inputs via the operating section 2012.

Figure 5:
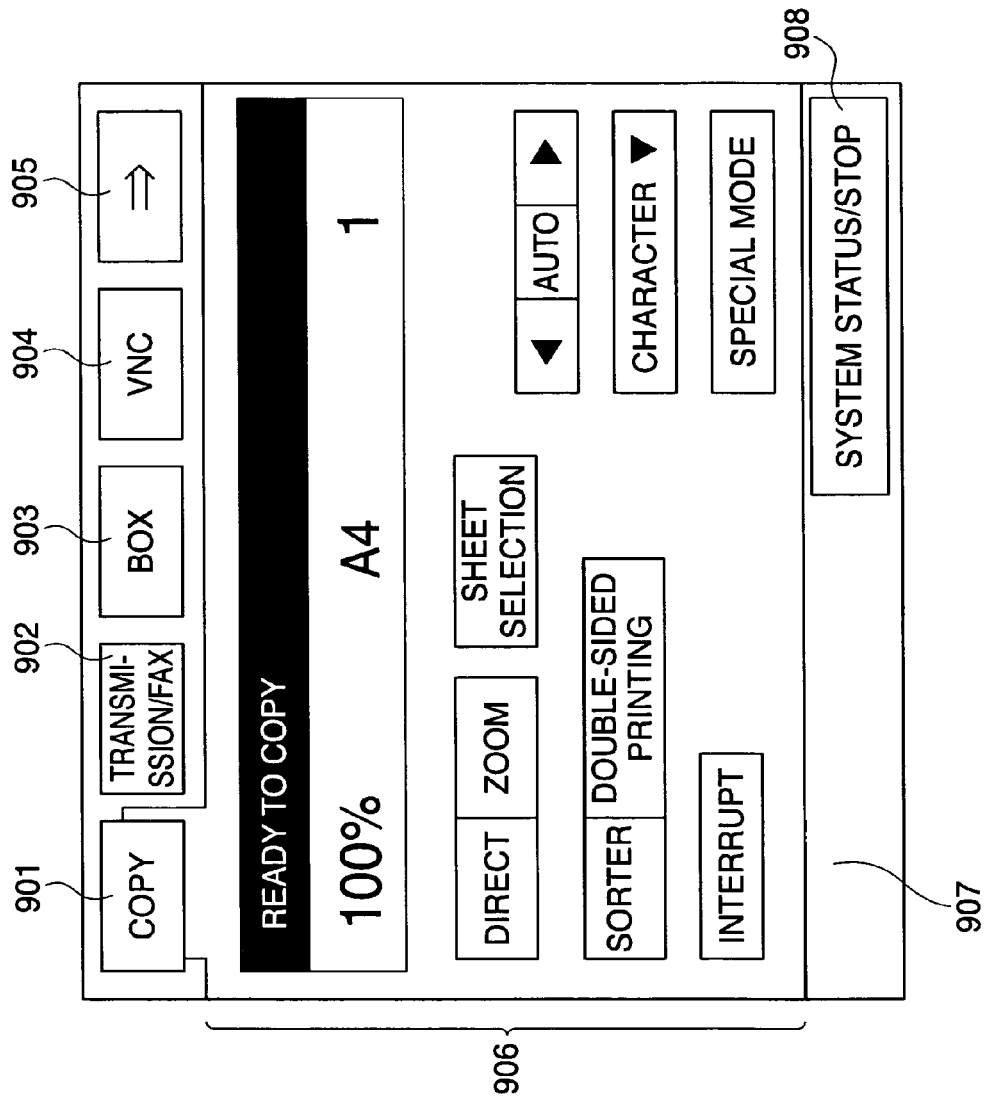
FIG. 5 is a diagram showing an example of an operating screen displayed on the operating section.

FIG. 5 is a diagram showing an example of the operating screen displayed on the operating section 2012.

As shown in FIG. 5, in the uppermost part of the operating screen on the operating section 2012, function tabs are displayed for use as touch keys for selecting desired ones from various functions provided for the copying machine 1001. These function tabs include a copy tab 901, a transmission/fax tab 902, a box tab 903, a VNC tab 904, and a right arrow button 905, for example.

FIG. 5 shows an initial screen displayed when the copy tab 901 as a touch key is pressed, for configuration of settings associated with the copying function. Display associated with the copying function is performed in an area 906. In a top portion of the area 906, a message, such as "Ready to copy", indicative of a status of the copying function is displayed. In a portion immediately below the top portion, a magnification/ reduction ratio, a selected sheet feed cassette, and the number of copies are displayed, and in a portion further below, a direct key, a zoom key, a sheet selection key, a sorter key, a double-sided printing key, an interrupt key, a character key, a left arrow key for print density adjustment for reducing print density, a right arrow key for print density adjustment for increasing print density, an auto key for automatic adjustment of print density, and a special mode key are displayed as touch keys for setting operating modes of the copying function. Screens for specifying respective operating modes which cannot be displayed on the initial screen are hierarchically displayed in the area 906 in response to pressing of the special mode key.

A status display area 907 displays a status of the copying machine 1001. For example, an alarm message indicative of occurrence of jamming, or a status message indicating that printing is being carried out in a PDL format is displayed in the status display area 907. Further, in the status display area 907, a system status/stop key 908 is displayed. By pressing the system status/stop key 908, it is possible to stop or abort a job being in process in the screen shown in FIG. 5, and in some cases, it is possible to display a screen, not shown, displaying device information on the copying machine 1001 or a screen, not shown, displaying the progress of a print job currently executed.

When the transmission/fax tab 902 is pressed, a setup screen, not shown, is displayed for sending an image read by the copying machine 1001 to an apparatus on the LAN 1006 by e-mail or FTP transmission, or by facsimile transmission using the public communication line 1008.

When the box tab 903 is pressed, a setup screen, not shown, is displayed for storing an image read by the copying machine 1001 in the box area of the HDD 2004, or for designating image data stored in the box area to print out the same or send the same to an apparatus on the LAN 1006.

Next, a description will be given of a method of using a remote machine at a remote location, such as the operating section 2012 of the copying machine 1001, to remotely control a local machine on the LAN 1006, such as the client computer 1005, or display a desktop screen of the local machine on the operating section 2012.

The remote control and the display of the desktop screen are performed using VNC (Virtual Network Computing). A system using VNC is comprised of a VNC server which allows access from a remote machine at a remote location to a desktop screen of a local machine via a network, and a VNC client (called "viewer") for displaying the accessed desktop screen. VNC is realized using a VNC protocol, such as the RFB (Remote Frame Buffer) protocol, defining procedures by which data in a frame buffer, a user input, and so forth are transferred between computers on a network. Thus, VNC makes it possible to control the desktop screen of the local machine via the screen of the remote machine.

In the system configuration shown in FIG. 1, to display the desktop screen of the client computer 1005 e.g. on the operating section 2012, first, a VNC server application is activated in advance on the client computer 1005. To this end, a VNC client program is installed in advance in the copying machine 1001. Then, the VNC client program is activated via the operating section 2012, whereby the desktop screen of the client computer 1005 can be displayed on the operating section 2012.

Figure 6:
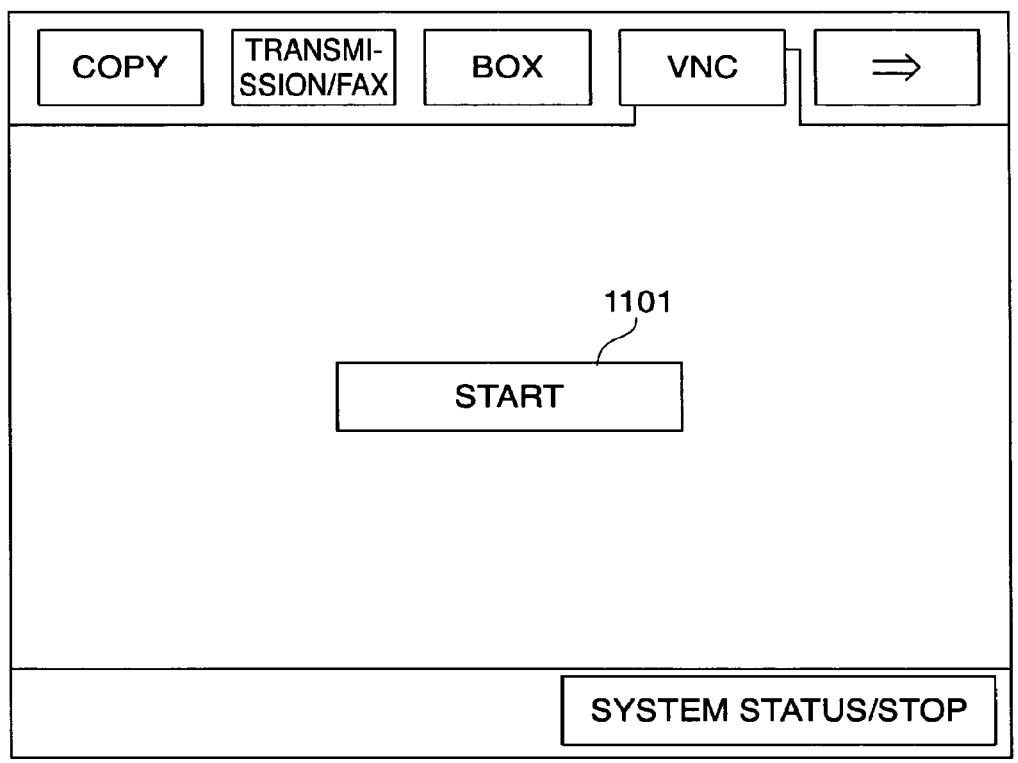
FIG. 6 is a view showing a start screen displayed on the operating section when a VNC tab within the operating screen shown in FIG. 5 is pressed.

When the VNC tab 904 shown in FIG. 5 is pressed, the screen displayed on the operating section 2012 is switched to a start screen, shown in FIG. 6, for establishing a VNC connection. When a start key 1101 is pressed on this start screen, the screen is switched to an authentication screen shown in FIG. 7. When an area 1102 in the authentication screen is pressed, it is possible to enter a server name via a keyboard screen, not shown, displaying a soft keyboard. Further, when an area 1103 is pressed, it is possible to a password via the keyboard screen. When an OK key 1105 is pressed after entry of the server name and the password, authentication is performed by the client computer 1005, and when the authentication is successfully performed, the VNC connection is started.

Figure 7:
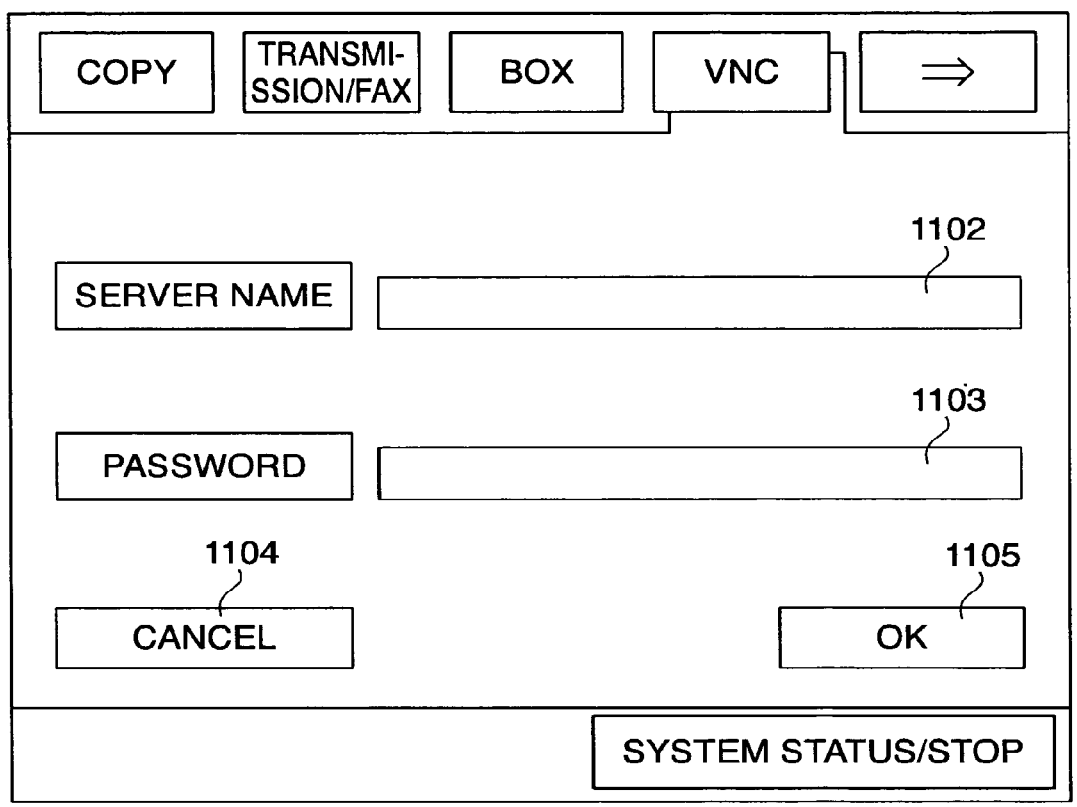
FIG. 7 is a view showing an authentication screen displayed on the operating section when a start tab within the start screen shown in FIG. 6 is pressed.
Figure 8:
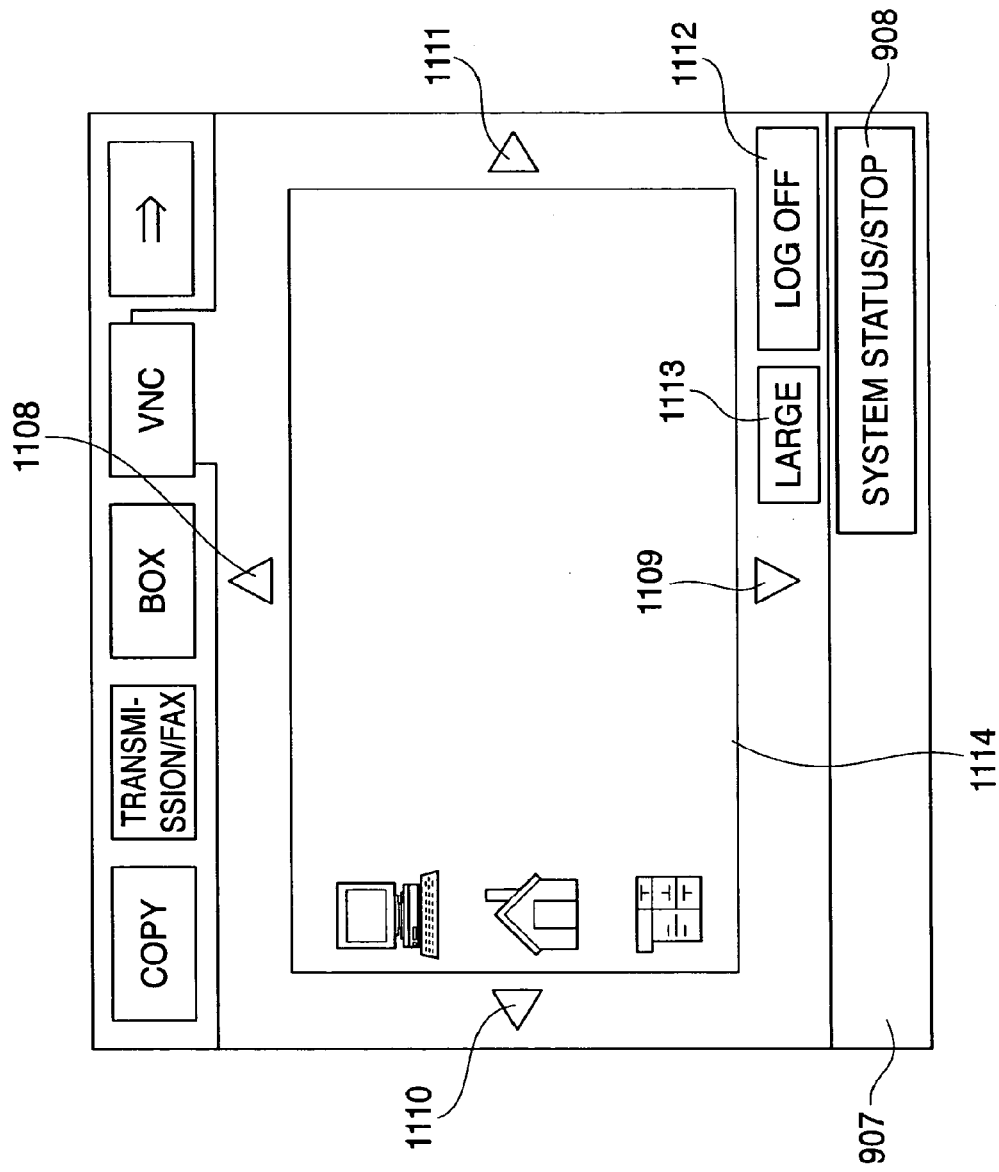
FIG. 8 is a view showing a screen of the operating section displaying a desktop screen of a client computer which has been successful in authentication performed via the authentication screen shown in FIG. 7.

FIG. 8 is a view showing a screen of the operating section 2012 displaying the desktop screen of the client computer 1005 which has been successful in authentication performed via the authentication screen shown in FIG. 7.

As shown in FIG. 8, the desktop screen is displayed within a frame 1114. Keys 1108, 1109, 1110 and 1111 displayed outside the frame 1114 are for designating respective directions of scrolling the desktop screen, i.e. upward, downward, leftward, and rightward directions. A log off key 1112 is pressed for terminating the VNC connection. When the log off key 1112 is pressed, the VNC connection is terminated, and the screen is switched back to the start screen in FIG. 6. A large key 1113 is pressed for switching the screen display to full-screen display. When the large key 1113 is pressed, the display area of the desktop screen is enlarged to extend from the function tab area in the uppermost part of the screen to the status display area 907 in the lowermost part of the screen.

Figure 9:
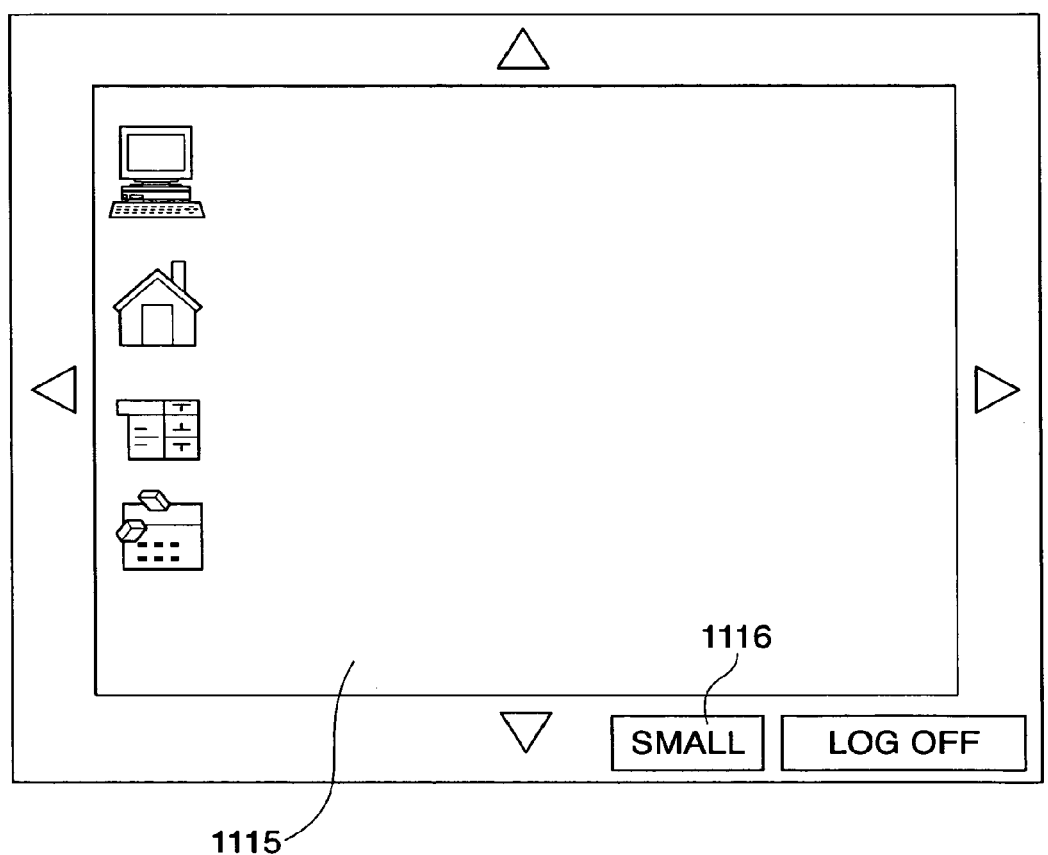
FIG. 9 is a view showing an example of a screen displayed on the operating section when a LARGE key within the screen shown in FIG. 8 is pressed.

FIG. 9 is a view showing an example of a screen displayed on the operating section 2012 when the large key 1113 is pressed. In the illustrated example of the desktop screen displayed in the full screen display, four icons are displayed, while in the desktop screen in FIG. 8 three of them are displayed.

When a small key 1116 displayed outside the frame 1115 is pressed on the screen shown in FIG. 9, the screen is switched back to the screen in FIG. 8.

Next, a description will be given of browser display on the operating section 2012.

The ROM 2003 of the controller unit 2000 has installed therein a program for web browser display, which enables web browser display to be presented in response to a user instruction via the operating section 2012.

In the case where the controller unit 2000 is provided with five or more functions, the right arrow button 905 is displayed at the right side of the four VNC function tabs 901 to 904, as illustrated in FIG. 5 showing the example of the operating screen of the operating section 2012. In the illustrated example, when the right arrow button 905 is pressed, a browser tab 1201 is displayed in place of the VNC tab 904, and the browser is activated at the same time, whereby the screen displayed on the operating section 2012 is switched to a browser screen shown in FIG. 10.

In the present embodiment, the copying machine 1001 incorporates not only the copying function, a transmission/ facsimile function, and a box function as basic functions, but also a VCN function and a browser function as extension functions. Whenever the right arrow button 905 is pressed on the screen shown in FIG. 5, display is switched between the desktop screen (VNC screen) and the browser screen. If six or more functions are incorporated in the copying machine 1001, the desktop screen (VNC screen), the browser screen, and screens for the sixth and following functions are switched one after another whenever the right arrow button 905 is pressed.

The browser screen shown in FIG. 10 includes a display area 1220 for display by the browser, and the display area 1220 includes a contents display area 1202 and a display area for displaying a plurality of keys described below.

A return key 1203 is pressed for returning a page to the immediately preceding one. An advance key 1204 is pressed for advancing a page to the next one. A stop key 1205 is pressed for stopping reading (loading) of a page. A re-read key 1206 is pressed for reloading a currently displayed page to display the same. A home key 1207 is pressed for displaying the homepage of a URL set in advance. On an initial screen of the browser function, there is displayed the homepage of the URL set in advance to be displayed when the home key 1207 is pressed. As the homepage set in advance, a blank page may be set.

A tool key 1208 is pressed for displaying tool screens, such as a bookmark screen, a history screen and a page saving screen. A display key 1209 is pressed for displaying a screen for use in changing a screen display magnification, a character size, a character code, and so forth. A configuration key 1210 is pressed for displaying a screen for configuring proxy server settings, security settings, and other settings necessary for browsing. A print key 1211 is pressed for printing a currently displayed page. When the print key 1211 is pressed, a print setup dialog is displayed. In the print setup dialog, a screen for setting how to print a frame and specifying settings (such as the number of copies, double-sided printing, sorting, etc.) concerning printing is displayed, and when a print start button within the screen is pressed, printing is started.

A full screen key 1212 is pressed for switching the browser screen to full-screen display. This processing will be described in detail hereinafter.

A menu off key 1213 is pressed for turning off the display of a menu screen comprised of the return key 1203, the advance key 1204, the stop key 1205, the re-read key 1206, the home key 1207, the tool key 1208, the display key 1209, the setup key 1210, the print key 1211, and the full screen key 1212. When the menu off key 1213 is pressed, the browser screen displayed on the operating section 2012 is switched to a browser screen shown in FIG. 11, in which the menu screen disappears, thereby making it possible to display contents hidden by the menu screen in the contents display area 1202 on the browser screen in FIG. 10. Further, a menu on key 1216 is displayed in place of the menu off key 1213, and when the menu on key 1216 is pressed, the MENU screen is displayed again, whereby the screen is switched back to the browser screen shown in FIG. 10.

Figure 10:
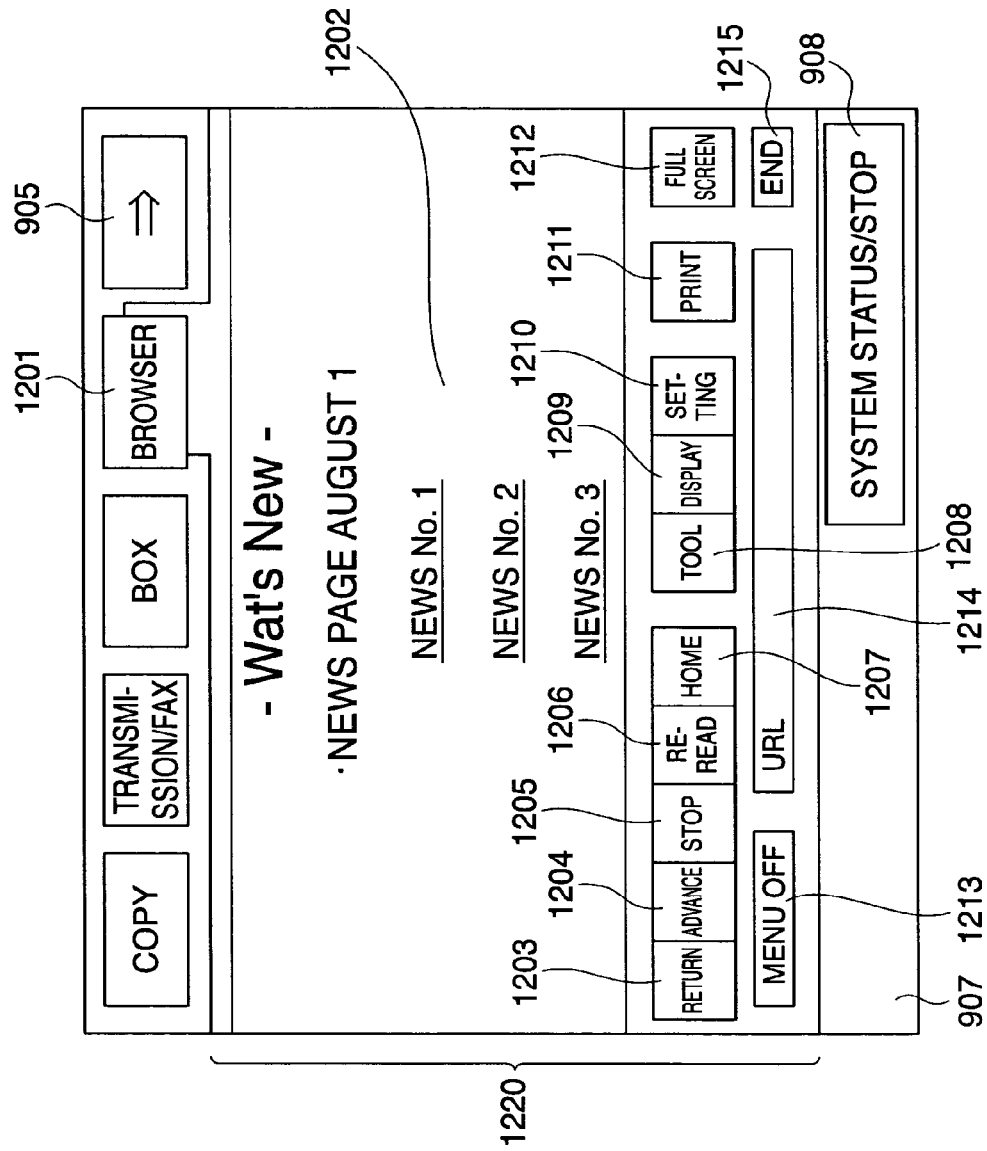
FIG. 10 is a view showing a browser screen displayed on the operating section when a right arrow button within the operating screen shown in FIG. 5 is pressed.
Figure 11:
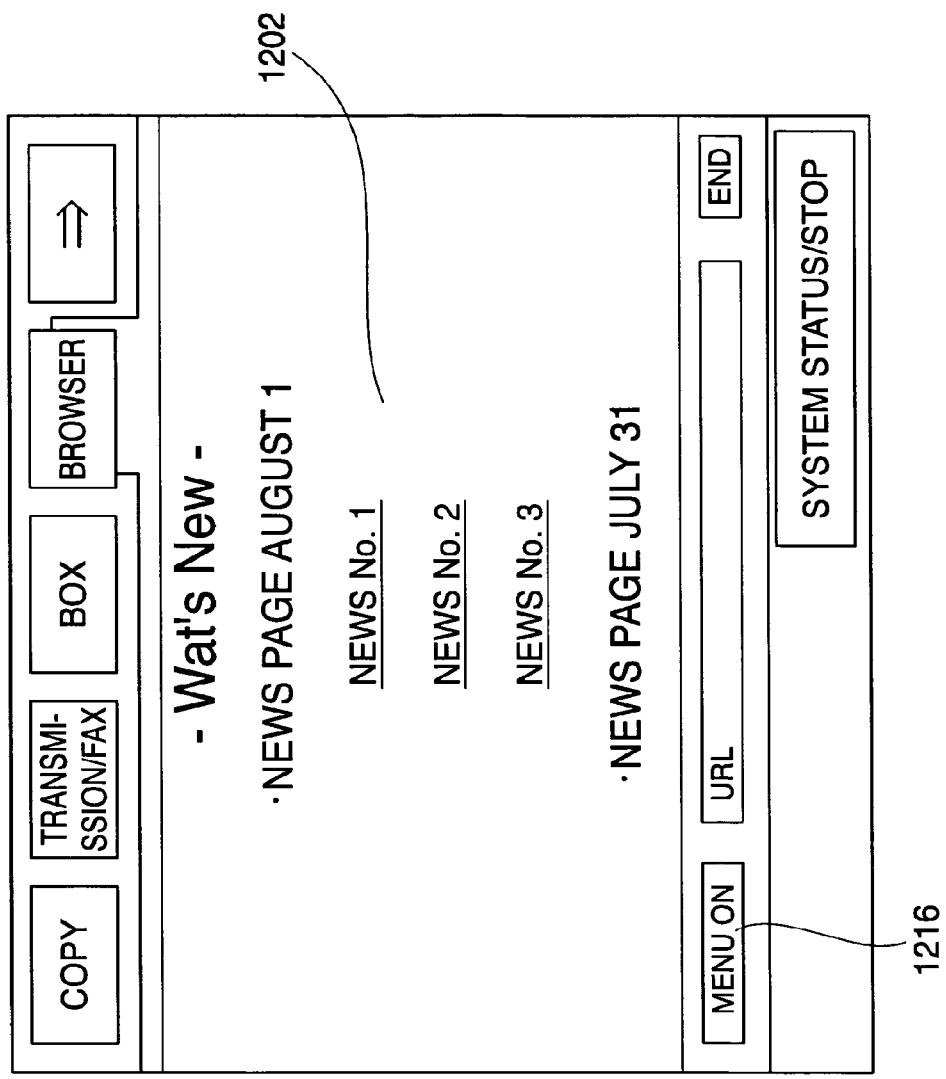
FIG. 11 is a view showing a browser screen displayed on the operating section when a MENU OFF key within the browser screen shown in FIG. 10 is pressed.

A URL entry section 1214 appearing in FIG. 10 is operated to designate a URL and open a page corresponding to the URL. The user can designate a URL via a keyboard screen displayed by pressing this field. An end key 1215 is pressed for terminating display of the browser screen. When the end key 1215 is pressed, the URL of a page to be displayed on the screen is switched to the URL of the homepage set in advance as a default homepage, and then the browser screen is switched back to the initial screen displayed before the start of the browser function.

Figure 12:
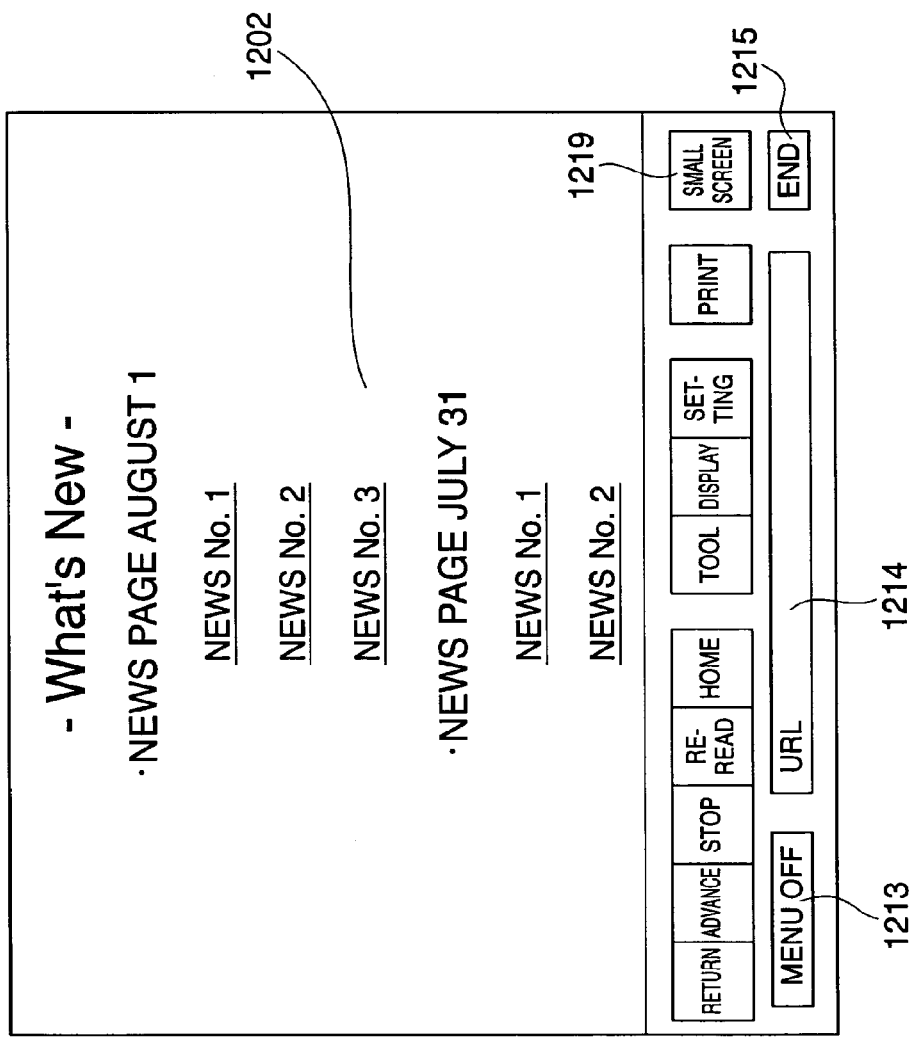
FIG. 12 is a view showing a browser screen displayed on the operating section when a FULL SCREEN key within the browser screen shown in FIG. 10 is pressed.

FIG. 12 is a view showing a browser screen displayed on the operating section 2012 when the full screen key 1212 on the browser screen shown in FIG. 10 is pressed.

On the browser screen shown in FIG. 12, the function tabs displayed in the uppermost part of the browser screen in FIG. 10, and the status display area 907 and the system status/stop key 908 in the lowermost part of the screen have disappeared, and the menu screen, and the menu off key 1213, the URL entry section 1214, and the end key 1215 are displayed in the lowermost part of the screen. Thus, the contents display area 1202 is displayed on an enlarged scale.

Figure 13:
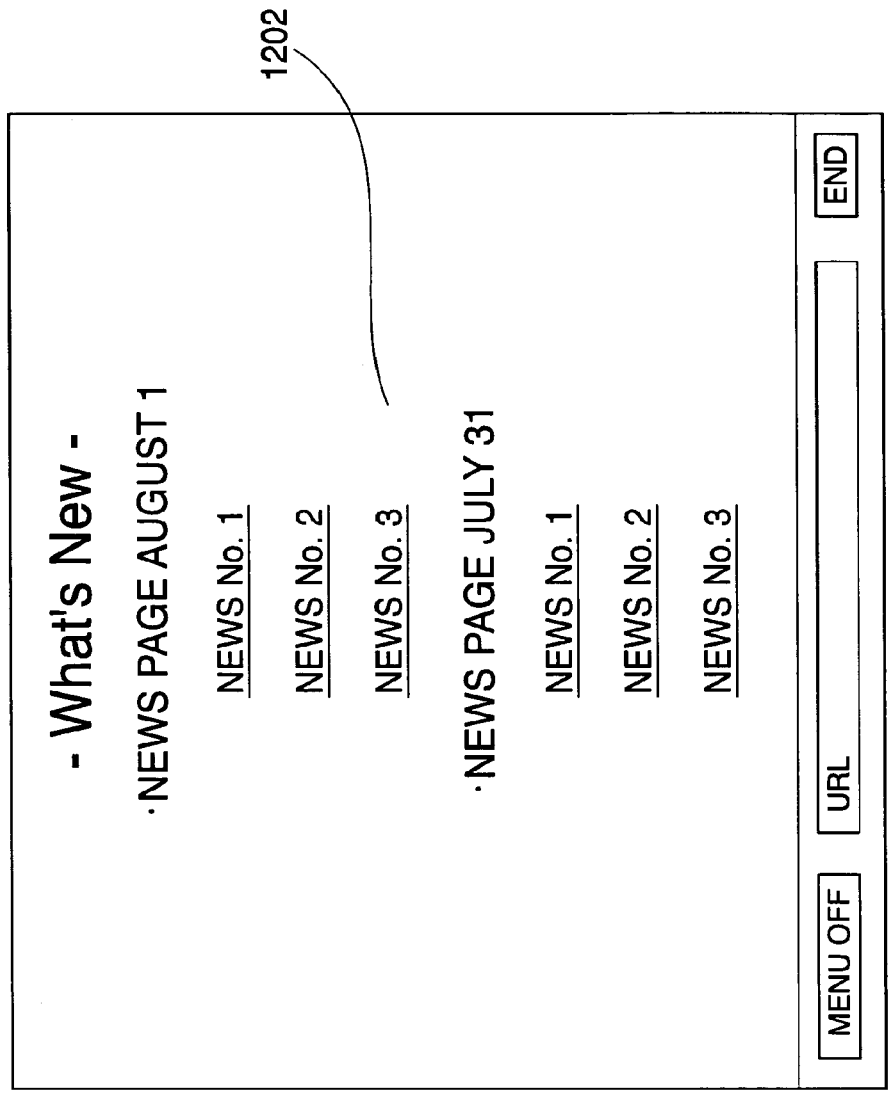
FIG. 13 is a view showing a browser screen displayed on the operating section when a MENU OFF key within the browser screen shown in FIG. 12 is pressed.

A small screen key 1219 is pressed for returning the screen displayed on the operating section 2012 to the browser screen shown in FIG. 10. When the small screen key 1219 is pressed, the function tabs, the status display area 1202, and the system status/stop key 908 are displayed again, and the contents display area 1202 is reduced in scale. Further, when the menu off key 1213 is pressed on the browser screen shown in FIG. 12, the screen displayed on the operating section 2012 is switched to a browser screen shown in FIG. 13, whereby the menu screen disappears to allow further enlargement of the contents display area 1202.

Next, a description will be given of an auto-clear function according to the present embodiment.

The auto-clear function is activated when the operating section 2012 has not been operated by the user over a predetermined time period, for returning set values for one or more predetermined functions (modes) to initial values and then switching the display screen back to an initial screen in accordance with the settings configured in advance, using screens shown in FIG. 14 and FIG. 15, described in detail hereinafter.

Figure 14:
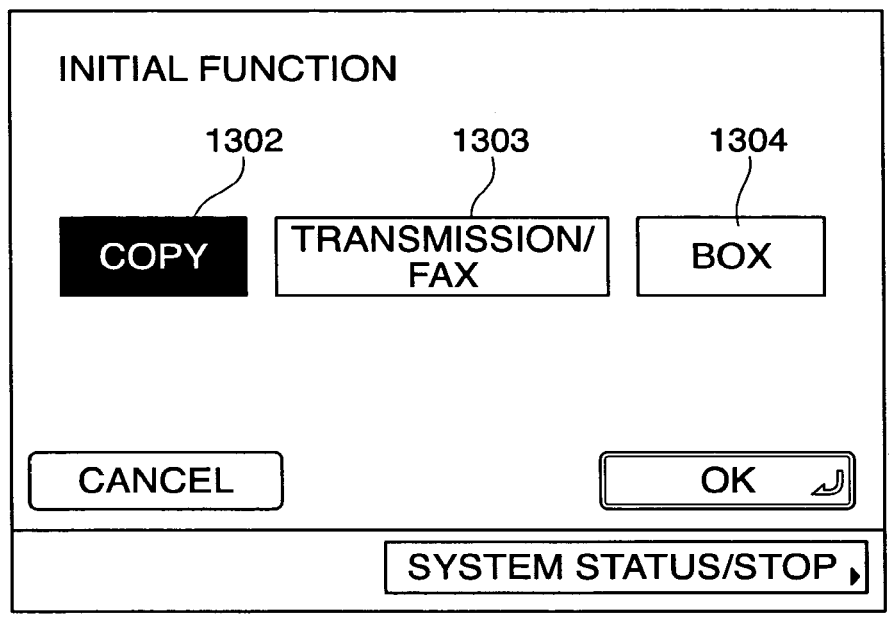
FIG. 14 is a view showing an initial function setup screen for selecting and setting in advance an initial function as the initial screen to be displayed on the operating section 2012 when the auto-clear function is activated.

FIG. 14 is a view showing an initial function setup screen for selecting and setting in advance an initial function as the initial screen to be displayed on the operating section 2012 when the auto-clear function is activated. On the initial function setup screen, a copy key 1302, a transmission/fax key 1303, and a box key 1304 are displayed. Selecting one of the displayed keys can designate an initial function to be set upon activation of the auto-clear function.

Figure 15:
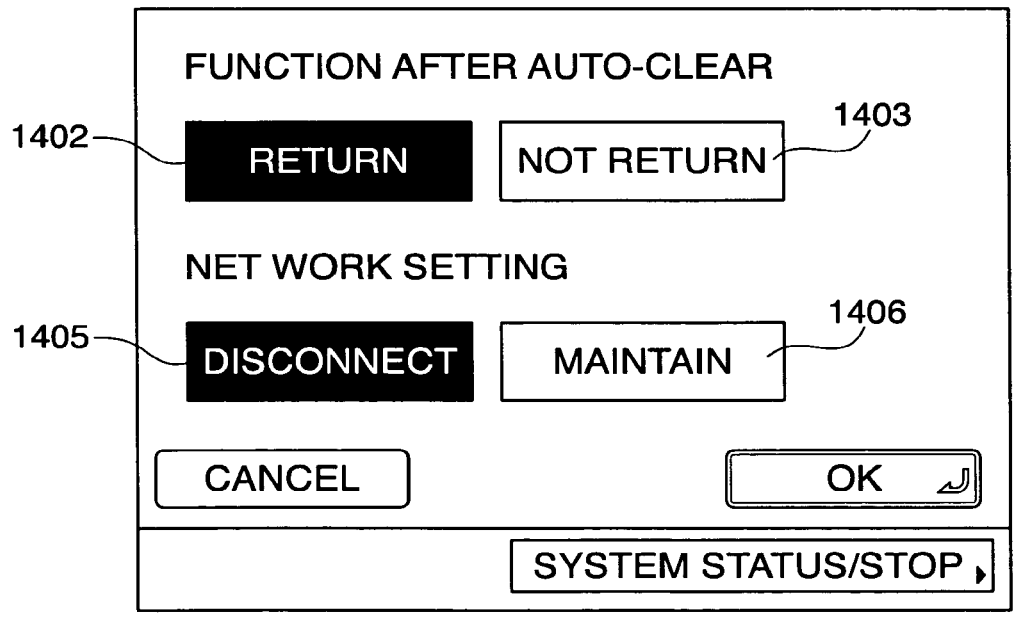
FIG. 15 is a view showing a setup screen for setting in advance whether set values of the initial function selected in the initial function setup screen in FIG. 14 are to be returned to the initial values after execution of the auto-clear function, and whether disconnection from the network is to be carried out as network settings after execution of the auto-clear function.

FIG. 15 is a view showing a setup screen for setting whether set values of the initial function selected in the initial function setup screen in FIG. 14 are to be returned to the initial values after execution of the auto-clear function and whether disconnection from the network is to be carried out as network settings after execution of the auto-clear function.

On the setup screen in FIG. 15, there are displayed a return key 1402 for selecting to return the set values of the initial function set in the initial function setup screen in FIG. 14 to the initial set values after execution of the auto-clear function, a non-return key 1403 for selecting not to return the set values of the initial function to the initial set values after execution of the auto-clear function, a disconnect key 1405 for selecting to disconnect from the network after execution of the auto-clear function, and a maintain key 1406 for selecting to maintain the connection to the network as it is. The disconnection from the network means not only disconnecting communications with the connected terminal, but also to switch the display screen back to an initial screen of the VNC function or the browser function.

The predetermined time period (hereinafter referred to as "the auto-clear time period") for determining that no key operation has been executed is set e.g. to two minutes, but this is not limitative. The user can arbitrarily set or change the auto-clear time period via the operating section 2012. If the auto-clear time period is set to "0", the auto-clear function is disabled.

Figure 16:
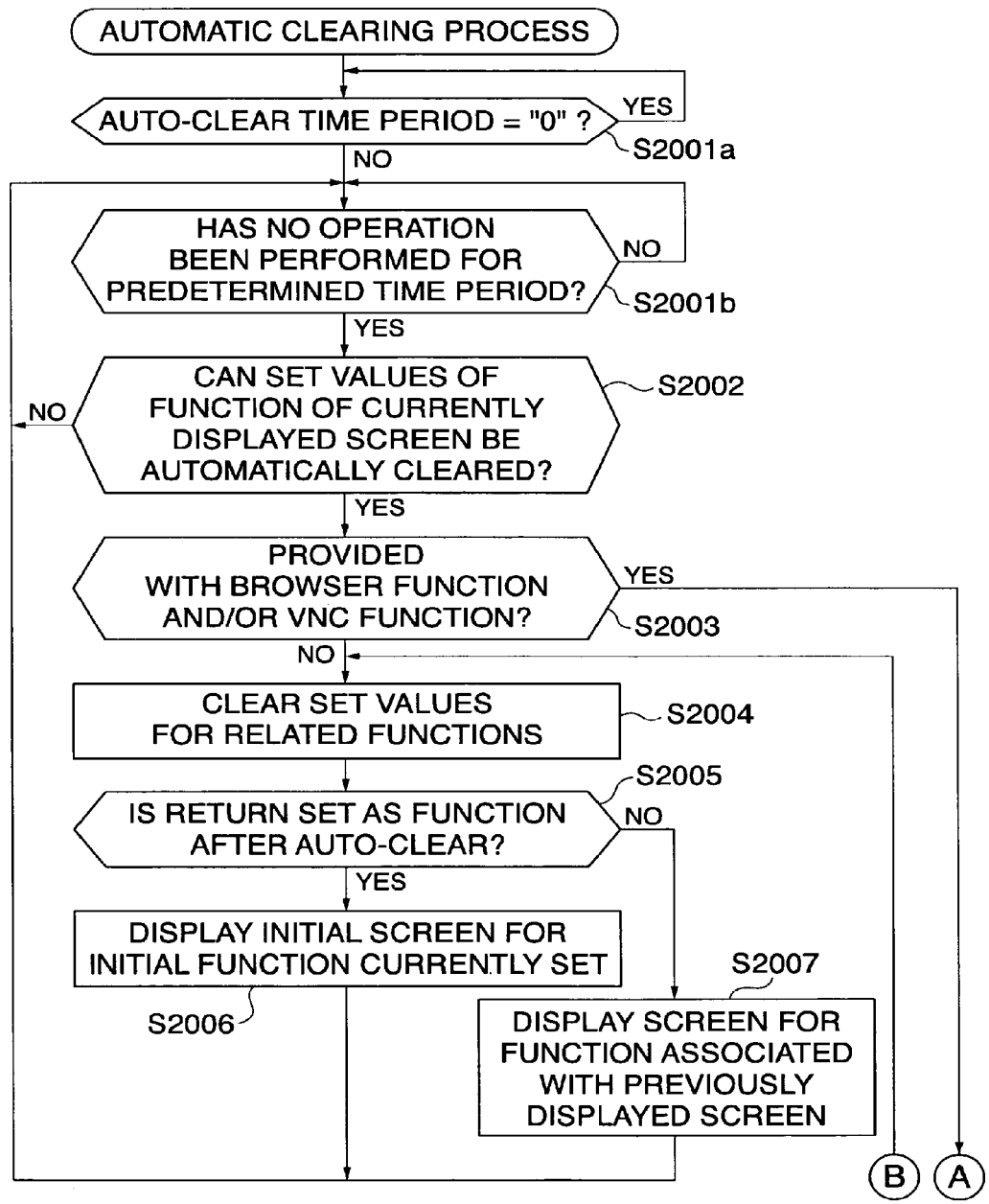
FIG. 16 is a flowchart of an automatic clearing process executed by a controller unit shown in FIG. 2.
Figure 17:
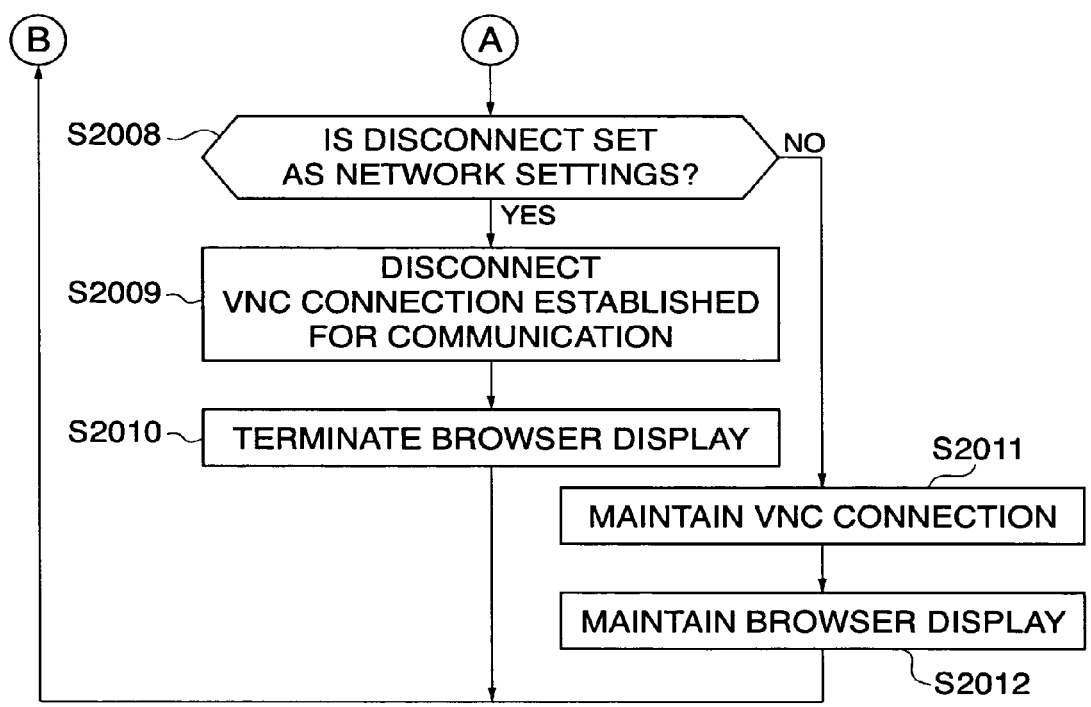
FIG. 17 is a continued part of the automatic clearing process in FIG. 16.

FIGS. 16 and 17 are flowchart of an automatic clearing process executed by the controller unit 2000 shown in FIG. 2.

First, it is determined in a step S2001a whether or not the auto-clear period is equal to "0". If it is equal to "0", the process returns to the step S2001a, whereas if it is not equal to "0", it is determined whether or not no key has been operated over the auto-clear time period (step S2001b). If the auto-clear time period has elapsed, the process proceeds to a step S2002, whereas if the auto-clear time period has not elapsed, the process returns to the step S2001a.

In the step S2002, it is determined whether or not settings associated with a function set on a screen currently displayed on the operating section 2012 can be automatically cleared. If the settings can be automatically cleared, the process proceeds to a step S2003. On the other hand, for example, if an alarm message indicative of occurrence of jamming is displayed e.g. when a screen associated with the copying function is displayed, it is judged that the settings cannot be automatically cleared, and the process returns to the step S2001a.

In the step S2003, it is determined whether or not at least one of the browser function and the VNC function (a function of the copying machine 1001 for accessing the desktop screen of the client computer 1005 from a remote location via the network and a function for displaying the accessed desktop screen on the operating section 2012) is installed in the controller unit 2000. If neither the VNC function nor the browser function is installed in the controller unit 2000, the process proceeds to a step S2004, whereas if at least one of the browser function and the VNC function is installed therein, the process proceeds to a step S2008, referred to hereinafter.

In the step S2004, set values of all the associated functions (modes), referred to hereinafter, are cleared to the initial values.

In a step S2005, it is determined whether or not a setting set via the setup screen shown in FIG. 15 is for switching the display screen back to an initial screen associated with an initial function set in the initial function setup screen shown in FIG. 14. If it is determined that the setting is for switching the display screen back to the initial screen, the process proceeds to a step S2006, whereas if not, the process proceeds to a step S2007.

In the step S2006, the function of the copying machine 1001 is switched to the initial function set in the initial function setup screen shown in FIG. 14, and the initial screen associated with the initial function is displayed on the operating section 2012. For example, if the copy key 1302 has been selectively set in advance on the initial function setup screen in FIG. 14, and the copying machine 1001 is left idle with a screen for the box function displayed, the set values associated with the copying function, the transmission/facsimile function, and the box function are reset to the respective initial values, and the initial screen (FIG. 5) for the copying function is displayed on the operating section 2012.

In a step S2007, the initial screen associated with the function having been displayed on the operating section 2012 continuous to be displayed on the operating section 2012. For example, if the copy key 1302 has been selectively set in advance on the initial function setup screen in FIG. 14 and the copying machine 1001 is left idle with the screen for the box function displayed, the set values associated with the copying function, the transmission/facsimile function, and the box function are reset to the initial values, and an initial screen, not shown, for the box function is displayed on the operating section 2012.

On the other hand, if it is determined in the step S2003 that at least one of the browser function and the VNC function has been installed in the controller unit 2000, the value set for the network settings in the setup screen shown in FIG. 15 is used in the step S2008. More specifically, it is determined which of the disconnect key 1405 and the maintain key 1406 has been selectively set for the network settings. If the disconnect key 1405 has been selectively set, the process proceeds to a step S2009, while if the maintain key 1406 has been selectively set, the process proceeds to a step S2011, referred to hereinafter.

In the step S2009, if the controller unit 2000 is provided with the VNC function, and communication is being performed via the VNC connection, the VNC connection established for the communication is disconnected. Next, in a step S2010, if the controller unit 2000 is provided with the browser function and browser display is being performed, the browser display is terminated.

Then, the process proceeds to the step S2004. In this case, the steps S2004 et seq. are executed in one of four different ways described below, depending on a function associated with the screen about which a determination was made in the step S2001b, and the processing performed in the steps S2009 and S2010.

In a first case where communication is performed via the VNC connection, and the copying machine 1001 is left idle with the VNC screen in FIG. 8 or 9 displayed on the operating screen 2012, the VNC connection established for the communication is disconnected in the step S2009, and then in the step S2004, the set values associated with the copying function, the transmission/facsimile function, and the box function are cleared to the initial values. If it is determined in the following step S2005 that the screen is to be switched back to an initial screen associated with an initial function set in the initial function setup screen in FIG. 14 after execution of the auto-clear function, the initial screen for the initial function is displayed (step S2006). On the other hand, if it is determined in the step S2005 that the screen is not to be switched back to the initial screen for the initial function after execution of the auto-clear function, the start screen, shown in FIG. 6, for the VNC function is displayed on the operating section 2012 (step S2007).

In a second case where communication is performed via the VNC connection and then the copying machine 1001 is left idle in a state where a screen associated with a function other than the VNC function is displayed, the VNC connection established for the communication is disconnected in the step S2009, as in the above described first case, and then in the step S2004, the set values associated with the copying function, the transmission/facsimile function, and the box function are cleared to the initial values, whereafter the initial screen associated with the initial function is displayed on the operating section 2012, according to the settings configured in the setup screens shown in FIGS. 14 and 15 (step S2006 or S2007).

Thus, in these first and second cases, when the VNC tab 904 is pressed to select the VNC function after execution of the auto-clear function, the start screen shown in FIG. 6, which is an initial screen for the VNC function, is displayed on the operating section 2012.

In a third case where the browser function is actuated and then the copying machine 1001 is left idle in a state where one of the browser screens in FIGS. 10 to 13 is displayed, the browser display is terminated in the step S2010, and in the step S2004, the set values associated with the copying function, the transmission/facsimile function, and the box function are cleared to the initial values. If it is determined in the following step S2005 that the screen is to be switched back to the initial screen associated with the initial function after execution of the auto-clear function, the initial screen for the function is displayed (step S2006). On the other hand, if it is determined in the step S2005 that the screen is not to be switched back to the initial screen for the initial function after execution of the auto-clear function, the screen for the browser function continues to be displayed on the operating section 2012 (step S2007). On the initial screen for the browser function, a homepage corresponding to a URL set by the home key 1207 appearing in FIG. 10 is displayed, and hence even when it is determined in the step S2005 that the screen is not to be switched back to the initial screen for the initial function (the step S2007), if the initial function set in the initial function setup screen in FIG. 14 is the browser function, the initial screen for the browser function is displayed in the step S2006.

Further, in a fourth case where the copying machine 1001 is left idle with browser display maintained and in a state where a screen associated with a function other than the browser function is displayed, the browser display is terminated in the step S2010, as in the above described third case, and then in the step S2004, the set values associated with the copying function, the transmission/facsimile function, and the box function are cleared to the initial values, whereafter the initial screen associated with the initial function is displayed on the operating section 2012, according to the settings configured in the setup screens shown in FIGS. 14 and 15 (step S2006 or S2007).

Thus, in these third and fourth cases, when the browser tab 1201 appearing in FIG. 10 is pressed or the right arrow button 905 is pressed on the screen shown in FIG. 5, to select the browser function, after execution of the auto-clear function, the browser is activated, and the homepage corresponding to the URL set by the home key 1207 is displayed again on the initial screen.

Referring again to FIG. 17, if it is determined in the step S2008 that the maintain key 1406 has been selected as the network settings in FIG. 15, the process proceeds to a step S2011. If the controller unit 2000 is provided with the VNC function, and if communication is being performed via the VNC connection, the VNC connection established for the communication is maintained and the set value associated with the VNC function are prevented from being cleared in the step S2004. Next, in a step S2012, if the controller unit 2012 is provided with the browser function, and if the browser has been activated, the browser display is maintained and the set values associated with the browser function are prevented from being cleared in the step S2004.

Then, the process proceeds to the step S2004. In this case, the steps S2004 et seq. are executed in one of four different ways described below, according to the function associated with the screen about which a determination was made in the step S2001b and the processing performed in the steps S2011 and S2012.

In a first case where communication is performed via the VNC connection, and then the copying machine 1001 is left idle in a state where the VNC screen (desktop screen) shown in FIG. 8 or 9 is displayed, the VNC connection established for the communication is maintained in the step S2011, and then in the step S2004, the set values associated with the copying function, the transmission/facsimile function, and the box function are cleared to the initial values. If it is determined in the following step S2005 that the screen is to be switched back to an initial screen associated with an initial function after execution of the auto-clear function, the initial screen for the initial function is displayed (step S2006). On the other hand, if it is determined in the step S2005 that the screen is not to be switched back to the initial screen for the initial function after execution of the auto-clear function, the display is maintained with the VNC connection established (step S2007).

In a second case where communication is performed via the VNC connection and then the copying machine 1001 is left idle in a state where a screen associated with a function other than the VNC function is displayed, the VNC connection established for the communication is maintained in the step S2011, and in this state, the set values associated with the copying function, the transmission/facsimile function, and the box function are cleared to the initial values in the step S2004, whereafter the initial screen associated with the initial function is displayed on the operating section 2012, according to the settings configured in the setup screens shown in FIGS. 14 and 15 (step S2006 or S2007).

Thus, in these first and second cases, when the VNC tab 904 is pressed to select the VNC function after execution of the auto-clear function, not the start screen for the VNC function, but a screen for use in communication via the VNC connection, an example of which is shown in FIG. 8 or 9, is displayed on the operating section 2012.

In a third case where the browser is activated and then the copying machine 1001 is left idle in a state where a browser screen is displayed, the browser display is maintained in the step S2012, and in this state, the set values associated with the copying function, the transmission/facsimile function, and the box function are cleared to the initial values in the step S2004. If it is determined in the following step S2005 that the screen is to be switched back to the initial screen associated with the initial function after execution of the auto-clear function, the initial screen for the initial function is displayed (step S2006). On the other hand, if it is determined in the step S2005 that the screen is not to be switched back to the initial screen for the initial function after execution of the auto-clear function, the display of the browser screen is maintained (step S2007).

Further, in a fourth case where the copying machine 1001 is left idle with the browser activated and in a state where a screen associated with a function other than the browser function is displayed, the set values associated with the copying function, the transmission/facsimile function, and the box function are cleared to the initial values in the step S2004 with the browser being kept active, whereafter the initial screen associated with the initial function is displayed on the operating section 2012, according to settings in the setup screens shown in FIGS. 14 and 15 (step S2006 or S2007).

Thus, in these third and fourth cases, when the browser tab 1201 appearing in FIG. 10 is pressed or the right arrow button 905 is pressed on the screen shown in FIG. 5 after execution of the auto-clear function, the browser is not activated, and the page displayed previously continues to be displayed.

As described above, according to the first embodiment, the automatic clearing process for any of the functions provided for the copying machine 1001 can be performed according to the setting configured in advance in the initial setup screen shown in FIG. 14 and the settings configured in advance in the setup screen related to the return of the display screen and the network settings, shown in FIG. 15. This makes it possible to selectively carry out disconnection or maintenance of VNC connection established for communication and termination or maintenance of browser display.

More specifically, the user is allowed to selectively set whether the communication connection required for realizing the function of displaying the status of a remote machine or apparatus (client computer 1005) on the network and the communication connection required for realizing the function of displaying contents on the network are to be maintained even after execution of the auto-clear function or terminated upon activation of the same, which makes it possible to improve operability of the multi-function machine after execution of the auto-clear function.

Further, the user can make a setting for disconnecting the communication connection after execution of the auto-clear function, in advance. As a result, when the user has not carried out an input operation on the operating screen over a predetermined time period, it is possible to disconnect the communication connection in timing synchronous with execution of the automatic clearing process, thereby improving privacy protection and security.

Furthermore, the user can make a setting for maintaining the communication connection after execution of the auto-clear function, in advance. As a result, when data e.g. from a database shared by a group of users has been displayed on a multi-function machine using the VNC function or the browser function, set values associated with functions other than the functions related to the communication connection like the VNC function and the browser function can be cleared to the initial values, with the communication connection being maintained, by the automatic clearing process. Therefore, when the multi-function machine is desired to perform display using the VNC function and/or the browser function after execution of the auto-clear function, there is no need to establish VNC connection again or restart the browser, which makes it possible to enhance the operability of the multi-function machine.

Next, a description will be given of a second embodiment of the present invention.

The configuration and elements of the second embodiment are basically the same as those of the first embodiment. Therefore, description thereof is omitted, while component parts and elements corresponding to those in the first embodiment are designated by the same reference numerals, and only different points from the first embodiment will be described.

As is distinct from the first embodiment in which whether to maintain the network configuration process for VNC connection or browser display even after execution of the auto-clear function is determined according to which of the disconnect key 1405 and the maintain key 1406 was selectively set, in the second embodiment, the determination is performed according to whether or not an address (VNC connection destination) connected by VNC connection is registered in advance or whether or not the URL of a page displayed by the browser is registered in advance.

Figure 18:
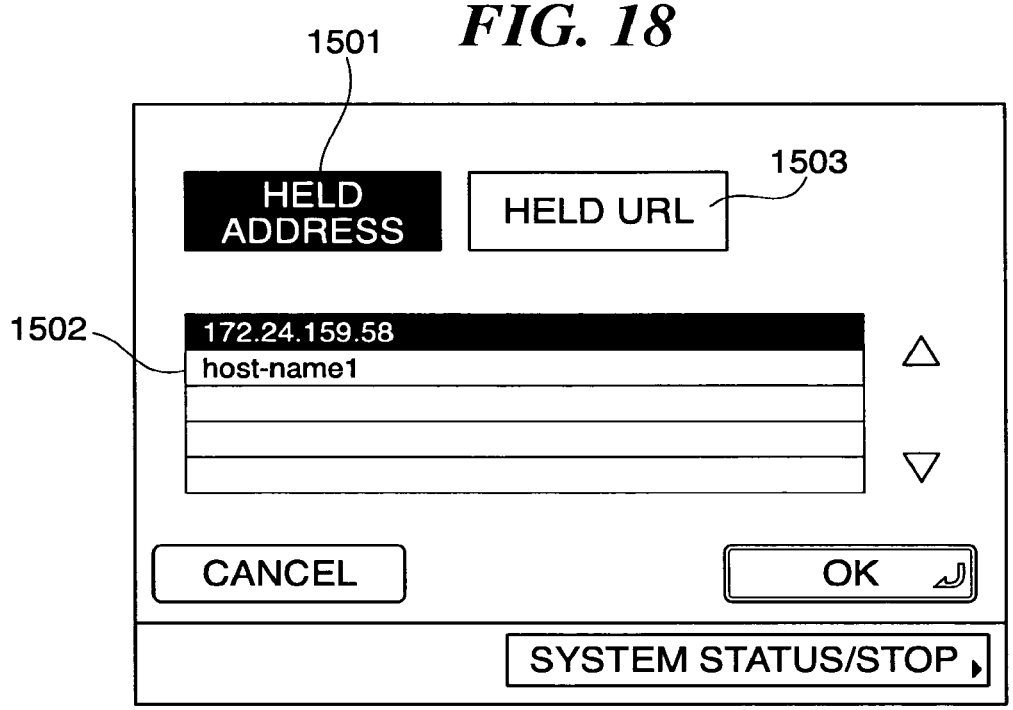
FIG. 18 is a view showing a registration screen displayed on the operating section of a multi-function machine according to a second embodiment of the present invention, for registration of VNC connection destinations and URLs, wherein a HELD ADDRESS key is selectively operated.
Figure 19:
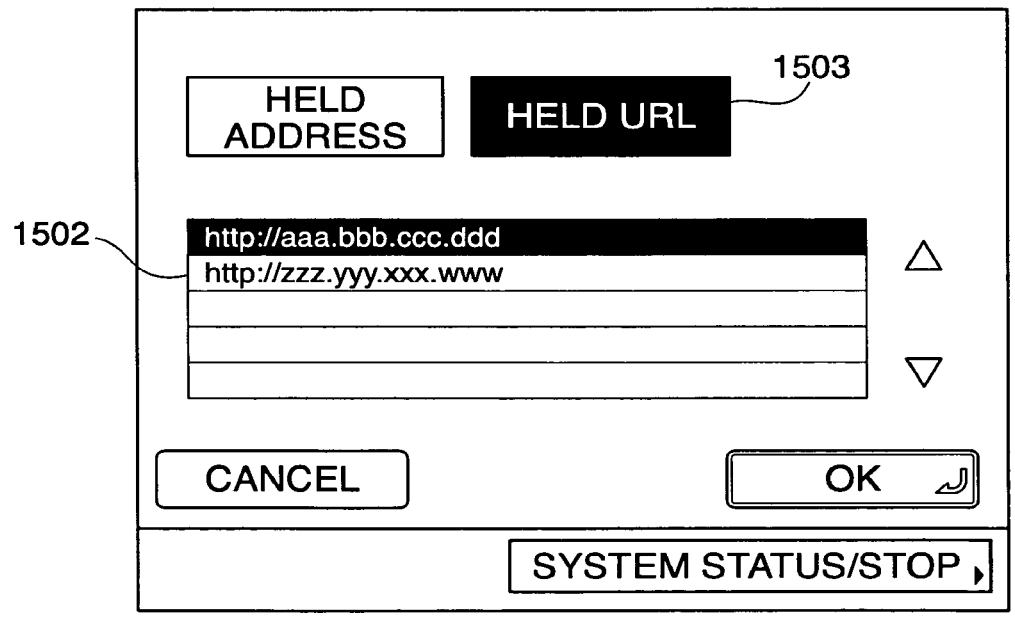
FIG. 19 is a view showing a state of the registration screen in FIG. 18, wherein a HELD URL key is selectively operated.

FIGS. 18 and 19 are views showing a registration screen displayed on the operating section 2012, for registration of VNC connection destinations and URLs in the second embodiment.

In the registration screen, there are provided a held address key 1501, a held URL key 1503, and a list display section 1502. When the held address key 1501 is selected as shown in FIG. 18, a list of held addresses registered in advance as VNC destinations is displayed in the list display section 1502. On the other hand, when the held URL key 1503 is selected as shown in FIG. 19, a list of URLs registered in advance is displayed in the list display section 1502.

The held addresses displayed in the list display section 1502 in FIG. 18 are each registered for maintaining connection to the associated VNC connection destination even after execution of the auto-clear function when the copying machine 1001 is connected thereto. The registration screen enables registration of a new VNC connection destination.

The URLs displayed in the list display section 1502 in FIG. 19 are each registered for maintaining browser display associated with the URL even after execution of the auto-clear function. The registration screen enables registration of a new URL.

Figure 20:
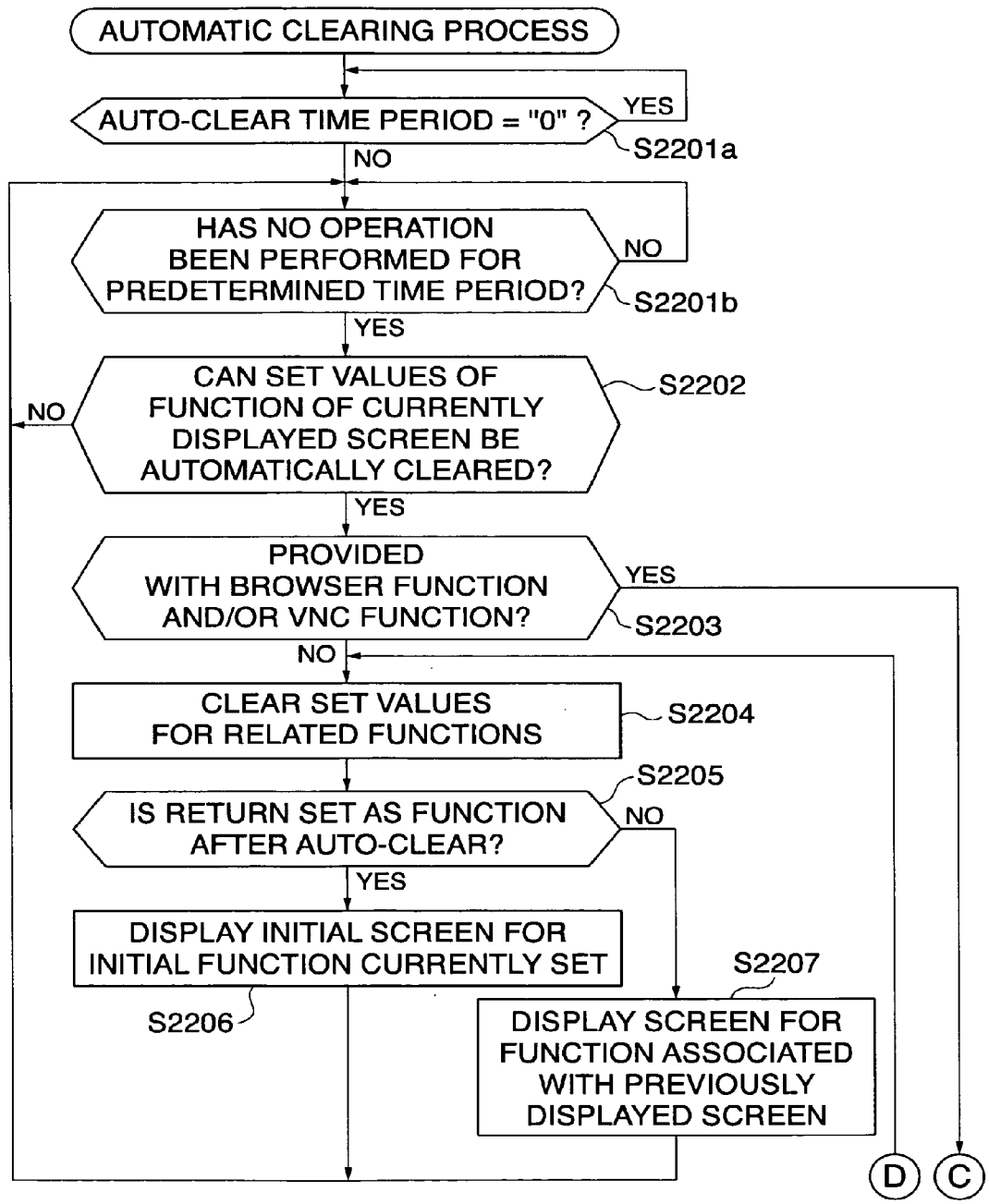
FIG. 20 is a flowchart of an automatic clearing process executed in the second embodiment.
Figure 21:
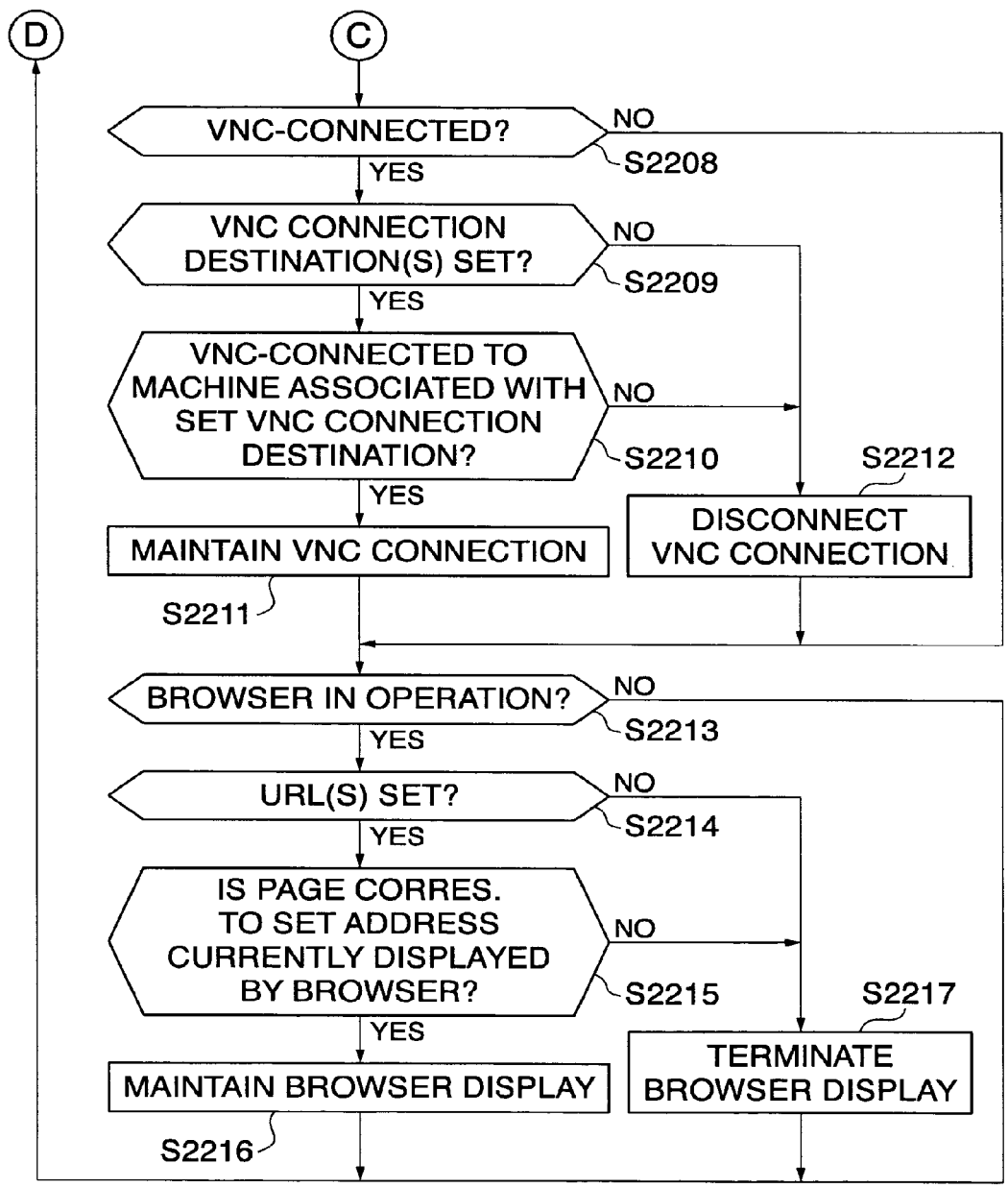
FIG. 21 is a continued part of the automatic clearing process in FIG. 20.

FIGS. 20 and 21 are a flowchart of an automatic clearing process executed in the second embodiment.

It should be noted that steps S2201a to S2207 shown in FIG. 20 are identical to the steps S2001 to S2007 shown in FIG. 16 in the first embodiment, and therefore description thereof is omitted.

In the second embodiment, when at least one of the browser function and the VNC function has been incorporated in the controller unit 2000, the user is allowed to register a VNC connection destination and/or a URL in advance via the registration screen as described hereinbefore, and when the registration is performed, it is not necessary to carry out the network settings shown in FIG. 15 in the first embodiment.

If it is determined in a step S2203 in FIG. 20 that at least one of the browser function and the VNC function has been incorporated in the controller unit 2000, the process proceeds to a step S2208, wherein it is determined whether or not communication is being performed via VNC connection. If communication is being performed via VNC connection, the process proceeds to a step S2209, whereas if communication is not being performed, the process proceeds to a step S2213.

In the step S2209, it is determined whether or not one or more VNC connection destinations are set (registered) in the registration screen shown in FIG. 18. If there are VNC connection destinations set (registered) in the registration screen, the process proceeds to a step S2210, whereas if not, the process proceeds to a step S2212.

In the step S2210, it is determined whether or not the copying machine 1001 is VNC-connected to a machine or apparatus corresponding to any one of the set VNC connection destinations. If the copying machine 1001 is VNC-connected to the machine or apparatus, the process proceeds to a step S2211, whereas if not, the process proceeds to the step S2212.

In the step S2211, the VNC connection established for communication is maintained.

If it is determined in the step S2209 that there is no VNC connection destination set in the registration screen, or if it is determined in the step S2210 that VNC connection for the copying machine 1001 has been established, but the copying machine 1001 is connected to a machine or apparatus corresponding to a VNC connection destination not set (registered) in the list display section 1502, the VNC connection established for communication is disconnected in the step S2212.

Then, in the step S2213, it is determined whether or not the browser is in operation. If the browser is in operation, the process proceeds to a step S2214, whereas if not, the process proceeds to the step S2204.

In the step S2214, it is determined whether or not there are one or more URLs set (registered) in the registration screen shown in FIG. 19. If there are URLs set (registered) in the registration screen, the process proceeds to a step S2215, whereas if not, the process proceeds to a step S2217.

In the step S2215, it is determined whether or not a page corresponding to one of the set URLs is currently displayed on the operating section 2012 by the browser. If the page is currently displayed, the process proceeds to a step S2216, whereas if not, the process proceeds to the step S2217.

In the step S2216, the browser display is maintained as it is.

If it is determined in the step S2214 that there is no URL set in the registration screen, or if it is determined in the step S2215 that the browser is in operation, but a page corresponding to a URL different from the URLs set (registered) in the list display section 1502 is currently displayed on the operating section 2012, the browser display is terminated, and the process proceeds to the step S2204.

Next, a description will be given of the steps S2204 et seq. by taking first to eighth cases as examples.

In the first case where the copying machine 1001 performs communications via VNC connection with a machine or apparatus associated with a VNC connection destination set (registered) in the registration screen shown in FIG. 18, and then the copying machine 1001 is left idle in a state where a VNC screen (desktop screen) of the machine or apparatus is displayed on the operating section 2012, the VNC connection established for the communication is maintained (step S2211), and in this state, the set values associated with the copying function, the transmission/facsimile function, and the box function are cleared to the initial values in the step S2204. If it is determined in the following step S2205 that the screen is to be switched back to the initial screen associated with the initial function set in the initial function setup screen in FIG. 14 after execution of the auto-clear function, the initial screen for the initial function is displayed (step S2206). On the other hand, if it is determined in the step S2205 that the screen is not to be switched back to the initial screen for the initial function after execution of the auto-clear function, the VNC function start screen shown in FIG. 6 is displayed on the operating section 2012 (step S2207).

In the second case where the copying machine 1001 performs communications via VNC connection with a machine or apparatus corresponding to a VNC connection destination different from the VNC connection destination set (registered) in the registration screen shown in FIG. 18, and then the copying machine 1001 is left idle in a state where a VNC screen (desktop screen) of the machine or apparatus is displayed on the operating section 2012 of the copying machine 1001, the VNC connection established for the communication is disconnected (step S2212), and in the step S2204, the set values associated with the copying function, the transmission/facsimile function, and the box function are cleared to the initial values. Then, if it is determined in the following step S2205 that the screen is to be switched back to an initial screen associated with an initial function after execution of the auto-clear function, the initial screen is displayed (step S2206). On the other hand, if it is determined in the step S2205 that the screen is not to be switched back to the initial screen for the initial function after execution of the auto-clear function, the VNC function start screen shown in FIG. 6 is displayed on the operating section 2012 (step S2207).

In the third case where the copying machine 1001 performs communications via VNC connection with a machine or apparatus corresponding to a VNC connection destination set (registered) in the registration screen shown in FIG. 18, and then the copying machine 1001 is left idle in a state where a screen associated with a function other than the VNC function is displayed on the operating section 2012 of the copying machine 1001, the VNC connection established for the communication is maintained (step S2211), and in this state, the set values associated with the copying function, the transmission/facsimile function, and the box function are cleared to the initial values in the step S2204. Then, an initial screen associated with an initial function is displayed on the operating section 2012 according to the settings configured in the setup screens shown in FIGS. 14 and 15 (step S2206 or S2207).

In the fourth case where the copying machine 1001 performs communications via VNC connection with a machine or apparatus corresponding to a VNC connection destination different from the VNC connection destinations set (registered) in the registration screen shown in FIG. 18, and then the copying machine 1001 is left idle in a state where a screen associated with a function other than the VNC function is displayed on the operating section 2012 of the copying machine 1001, the VNC connection established for the communication is disconnected (step S2212), and in the step S2204, the set values associated with the copying function, the transmission/facsimile function, and the box function are cleared to the initial values. Then, an initial screen associated with an initial function is displayed on the operating section 2012 according to the settings configured in the setup screens shown in FIGS. 14 and 15.

In the fifth case where the copying machine 1001 is left idle in a state where a page associated with a URL set (registered) in the registration screen shown in FIG. 19 is displayed as the browser screen on the operating section 2012, the browser display is maintained (step S2216), and in this state, the set values associated with the copying function, the transmission/facsimile function, and the box function are cleared to the initial values in the step S2204. Then, if it is determined in the following step 2205 that the screen is to be switched back to an initial screen associated with an initial function after execution of the auto-clear function, the initial screen for the initial function is displayed (step S2206). On the other hand, if it is determined in the step 2205 that the screen is not to be switched back to the initial screen for the initial function after execution of the auto-clear function, the browser screen continues to be displayed (step S2007).

In the sixth case where the copying machine 1001 is left idle in a state where a page associated with a URL different from the URLs set (registered) in the registration screen shown in FIG. 19 is displayed as the browser screen on the operating section 2012, the browser display is terminated (step S2217), and in the step S2204, the set values associated with the copying function, the transmission/facsimile function, and the box function are cleared to the initial values. Then, if it is determined in the following step 2205 that the screen is to be switched back to an initial screen associated with an initial function after execution of the auto-clear function, the initial screen for the initial function is displayed (step S2206). Further, even if it is determined in the step 2205 that the screen is not to be switched back to the initial screen for the initial function after execution of the auto-clear function, the initial screen for the initial function set on the initial function setup screen in FIG. 14 is displayed (step S2207).

In the seventh case where the browser has been activated to currently display a page associated with a URL set (registered) in the registration screen shown in FIG. 19, as the browser screen on the operating section 2012, but the copying machine 1001 is left idle in a state where a screen associated with a function other than the browser function is displayed on the operating section 2012, the browser display is maintained (step S2216), and in this state, the set values associated with the copying function, the transmission/facsimile function, and the box function are cleared to the initial values in the step S2204. Then, an initial screen associated with an initial function is displayed on the operating section 2012 according to the settings configured in the setup screens shown in FIGS. 14 and 15 (step S2206 or S2207).

In the eighth case where the browser has been activated to currently display a page associated with a URL different from the URLs set (registered) in the registration screen shown in FIG. 19, as a browser screen on the operating section 2012, but the copying machine 1001 is left idle in a state where a screen associated with a function other than the browser function is displayed on the operating section 2012, the browser display is terminated (step S2217), and in the step S2204, the set values associated with the copying function, the transmission/facsimile function, and the box function are cleared to the initial values. Then, an initial screen associated with an initial function is displayed on the operating section 2012 according to the settings configured in the setup screens shown in FIGS. 14 and 15 (step S2206 or S2207).

As described above, according to the second embodiment, the automatic clearing process can be performed according to the setting configured in advance in the initial setup screen shown in FIG. 14, the settings configured in advance in the configuration screen related to the return of the display screen (not related to network settings) shown in FIG. 15, and VNC connection destinations and URLs set in advance using the registration screen shown in FIGS. 18 and 19. This makes it possible to selectively carry out disconnection or maintenance of VNC connection established for communication and termination or maintenance of browser display.

Further, although in the above described embodiments, when the auto-clear function is activated after communications are performed using the browser function or the VNC function, whether to maintain or disconnect the communication is set, the present invention is not limited to this configuration. For example, the copying machine 1001 may be configured to always maintain communication after execution of the auto-clear function, or to always disconnect communication after execution of the auto-clear function.

Also, although in the above described embodiments, an apparatus having a plurality of functions including a copying function is taken as an example, this is not limitative, but the present invention may be applied to an apparatus having only a browser function or a VNC function, and the apparatus may be configured such that after displaying a screen by the browser function or the VNC function, when no operation has been performed over a predetermined time period, the screen may continue to be displayed or may be caused to return to an initial screen.

Although the above described first and second embodiments relate to the cases where the automatic clearing function is activated when no operation has been performed over a predetermined time period, this is not limitative, but the same process as in the first or second embodiment may be carried out in the case where during execution of communications and display by the browser function or the VNC function, the screen is switched to a screen for another function (copying, transmission/facsimile, or box function), and then returned again to a screen by the browser function or the VNC function.

In this case, as to each of the browser function and the VNC function, a setting may be made in advance similarly to a setting carried out in the setup screen of FIG. 15 as to whether disconnection from the network is to be carried out or connection to the network is to be maintained, and when the screen is switched, the apparatus is caused to operate according to the setting. This setting may be made separately from that for the automatic clearing function, or may be made as a common setting applied to the automatic clearing function, so that the apparatus may be caused to operate in the same manner as it operates upon activation of the automatic clearing function.

Then, after the copying machine 1001 communicates with a terminal on the network according to the browser function or the VNC function, and displays information obtained by the communication, if another function (copying, transmission/facsimile, or box function) is selected to switch the display screen, it is determined based on the setting whether or not connection to the network for the browser function or the VNC function is to be disconnected (switched to the default screen) or maintained, and based on the result of the determination, the screen is switched to the default screen or maintained.

Further, the disconnection from the network or maintaining of the connection to the network may not be set by the operating section 2012, but the apparatus may be fixedly configured such that the connection to the network is disconnected or maintained.

Furthermore, the apparatus may be configured such that the display may be maintained when the apparatus has accessed to a predetermined URL as in the second embodiment or has been connected to a predetermined terminal by VNC connection, and in other cases, the display be returned to the default screen.

It is to be understood that the object of the present invention may also be accomplished by supplying a computer or a CPU with a program code of software, which realizes the functions of either of the above described embodiments, and causing the computer or CPU to read out and execute the program code.

The above program has only to realize the functions of either of the above described embodiments on a computer, and the form of the program may be an object code, a program code executed by an interpreter, or script data supplied to an OS.

Further, it is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

The present invention is not limited to the above described embodiments, but can be modified in various manners based on the subject matter of the present invention, which should not be excluded from within the scope of the present invention insofar as functions as recited in the appended claims or the functions performed by the construction of either of the above described embodiments can be achieved.

CROSS REFERENCE TO RELATED APPLICATION

This application claims priority from Japanese Patent Application No. 2004-105875 filed Mar. 31, 2004, which is hereby incorporated by reference herein.

What is claimed is:

1. A multi-function apparatus connectible to a network, the multi-function apparatus comprising:
   an operating unit that displays a predetermined display screen for receiving therethrough a user instruction for selecting one of a plurality of functions, including a network-display function for receiving information from a device on the network and displaying information based on the received information;
   a switching unit that switches between a first display screen for the network-display function and a second display screen for another function not including the network-display function to cause said operating unit to display the switched one as the predetermined display screen;
   a setting unit that sets as an operation mode of the multi-function apparatus, when the switching unit switches from the first display screen to the second display screen, one of a first operation mode in which a network connection for the network-display function is maintained or a second operation mode in which the network connection for the network-display function is disconnected;
   a control unit that controls, when said switching unit switches from the first display screen to the second display screen, to maintain the network connection for the network-display function in a case where the first operation mode is set by the setting unit, while to disconnect network connection for the network-display function in a case where the second operation mode is set by the setting unit.

2. A communication apparatus connectible to a network, the communication apparatus comprising:
   an operating unit that displays a display screen for receiving therethrough a user instruction for selecting one of a plurality of functions, including a network-display function for receiving information from a device on the network and displaying information based on the received information;
   a switching unit that switches between a first display screen for the network-display function and a second display screen for another function not including the network-display function to cause said operating unit to display the switched one as the display screen;
   a control unit that controls, when said switching unit switches from the first display screen to the second display screen, to maintain a network connection for the network-display function in a case where the information displayed on the first display screen is based on the information received from a specific connection destination, while to disconnect the network connection for the network-display function in a case where the information displayed on the first display screen is based on the information received from the connection destination other than the specific connection destination.

3. The multi-function apparatus as claimed in claim 1, wherein the predetermined information indicates at least one of status information of the device on the network or display information displayed by the device.

4. A control method for a multi-function apparatus connectible to a network and having an operating unit that displays a predetermined display screen for receiving therethrough an user instruction for selecting one of a plurality of functions, including a network-display function for receiving information from a device on the network and displaying information based on the received information, the method comprising:
   a switching step of switching between a first display screen for the network-display function and a second display screen for another function not including the network-display function to cause the operating unit to display the switched one as the predetermined display screen;
   a setting step of setting as an operation mode of the multi-function apparatus, when the switching step switches from the first display screen to the second display screen, one of a first operation mode in which a network connection for the network-display function is maintained or a second operation mode in which the network connection for the network-display function is disconnected; and
   a controlling step of controlling, when switching step switches from the first display screen to the second display screen, to maintain the network connection for the network-display function in a case where the first operation mode is set in the setting step, while to disconnect network connection for the network-display function in a case where the second operation mode is set in the setting step.

5. A non-transitory computer-readable recording medium storing a program executable by a computer to perform a control method for a multi-function apparatus connectible to a network and having an operating unit that displays a predetermined display screen for receiving therethrough an user instruction for selecting one of a plurality of functions, including a network-display function for receiving information from a device on the network and displaying information based on the received information, the method comprising:
   a switching step of switching between a first display screen for the network-display function and a second display screen for another function not including the network-display function to cause the operating unit to display the switched one as the predetermined display screen;
   a setting step of setting as an operation mode of the multi-function apparatus, when the switching step switches from the first display screen to the second display screen, one of a first operation mode in which a network connection for the network-display function is maintained or a second operation mode in which the network connection for the network-display function is disconnected; and
   a controlling step of controlling, when the switching step switches the first display screen to the second display screen, to maintain the network connection for the network-display function in a case where the first operation mode is set in the setting step, while to disconnect network connection for the network-display function in a case where the second operation mode is set in the setting step.

6. The communication apparatus as claimed in claim 2, further comprising:
   a connection destination registration unit that registers in advance specific information for specifying a connection destination on the network,
   wherein said control unit controls to maintain the network connection for the network-display function in a case where the information displayed on the first display screen is based on the information received from the connection destination specified by the specific information registered in advance by said connection destination registration unit, while to disconnect the network connection in a case where the information displayed on the first display screen is based on the information received from another connection destination other than the connection destination specified by the specific information registered in advance by said connection destination registration unit.

7. A control method for a communication apparatus connectible to a network and having an operating unit that displays a display screen for receiving therethrough a user instruction for selecting one of a plurality of functions, including a network-display function for receiving information from a device on the network and displaying information based on the received information, the method comprising:
   a switching step of switching between a first display screen for the network-display function and a second display screen for another function not including the network-display function to cause the operating unit to display the switched one as the display screen;
   a control step of controlling, when the switching step switches from the first display screen to the second display screen, to maintain a network connection for the network-display function in a case where the information displayed on the first display screen is based on the information received from a specific connection destination, while to disconnect the network connection for the network-display function in a case where the information displayed on the first display screen is based on the information received from the connection destination other than the specific connection destination.

8. A non-transitory computer-readable recording medium storing a program executable by a computer to perform a control method for a communication apparatus connectible to a network and having an operating unit that displays a display screen for receiving therethrough a user instruction for selecting one of a plurality of functions including a network-display function for receiving information from a device on the network and displaying information based on the received information, the method comprising:
   a switching step of switching between a first display screen for the network-display function and a second display screen for another function not including the network-display function to cause the operating unit to display the switched one as the display screen;
   a control step of controlling, when the switching step switches from the first display screen to the second display screen, to maintain a network connection for the network-display function in a case where the information displayed on the first display screen is based on the information received from a specific connection destination, while to disconnect the network connection for the network-display function in a case where the information displayed on the first display screen is based on the information received from the connection destination other than the specific connection destination.

\* \* \* \* \*